US012789809B2

(12) United States Patent
Dickson et al.

(10) Patent No.: US 12,789,809 B2
(45) Date of Patent: Nov. 10, 2026

(54) SYSTEMS AND METHODS FOR PREDICTIVE ENGINE OFF COASTING AND PREDICTIVE CRUISE CONTROL FOR A VEHICLE

(71) Applicant: Cummins Inc., Columbus, IN (US)

(72) Inventors: Jonathan A. Dickson, Columbus, IN (US); Kenneth M. Follen, Greenwood, IN (US); Arun Prakash Thunga Gopal, Columbus, IN (US); J. Steven Kolhouse, Columbus, IN (US); Manik Narula, Columbus, IN (US); Apurva Arvind Chunodkar, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 276 days.

(21) Appl. No.: 17/984,735

(22) Filed: Nov. 10, 2022

(65) Prior Publication Data

US 2023/0150502 A1 May 18, 2023

Related U.S. Application Data

(60) Provisional application No. 63/278,822, filed on Nov. 12, 2021.

(51) Int. Cl.
*B60W 30/18* (2012.01)
*B01D 53/92* (2006.01)
(Continued)

(52) U.S. Cl.
CPC ....... *B60W 30/18072* (2013.01); *B01D 53/92* (2013.01); *B60W 30/143* (2013.01);
(Continued)

(58) Field of Classification Search
CPC ......... B60W 30/18072; B60W 30/143; B60W 2030/1809; B60W 2510/0657;
(Continued)

(56) References Cited

U.S. PATENT DOCUMENTS

| | | | | |
|---|---|---|---|---|
| 4,286,683 | A * | 9/1981 | Zeigner | F02D 41/26 307/10.6 |
| 8,359,149 | B2 | 1/2013 | Shin | |
| 9,821,803 | B2 | 11/2017 | Johansson et al. | |
| 9,868,432 | B2 | 1/2018 | Sujan et al. | |
| 10,393,195 | B2 | 8/2019 | Follen et al. | |
| 10,487,762 | B2 * | 11/2019 | Vadlamani | F02D 41/123 |

(Continued)

FOREIGN PATENT DOCUMENTS

EP 2 794 329 10/2018

*Primary Examiner* — Olumide Ajibade Akonai
*Assistant Examiner* — Ashley Brown Raynal
(74) *Attorney, Agent, or Firm* — Foley & Lardner LLP

(57) ABSTRACT

Systems, methods, and apparatuses for improving predictive cruise control and predictive engine off coasting for a vehicle are provided. An apparatus includes one or more processing circuits having one or more memory devices coupled to one or more processors, the one or more memory devices configured to store instructions thereon that, when executed by the one or more processors, cause the one or more processors to: receive look ahead information and store the look ahead information in the one or more memory devices; receive vehicle information regarding operation of a vehicle including an engine; determine a coasting opportunity for the vehicle based on the look ahead information and the vehicle information; modulate a cruise control set speed based on the determined coasting opportunity; and turn the engine off during the determined coasting opportunity for the vehicle based on modulation of the cruise control set speed.

19 Claims, 12 Drawing Sheets

(51) Int. Cl.
*B60W 30/14* (2006.01)
*B60W 50/00* (2006.01)
*B60W 50/14* (2020.01)

(52) U.S. Cl.
CPC ........ *B60W 50/0097* (2013.01); *B60W 50/14* (2013.01); *B60W 2030/1809* (2013.01); *B60W 2510/06* (2013.01); *B60W 2510/10* (2013.01); *B60W 2510/30* (2013.01); *B60W 2552/15* (2020.02); *B60W 2554/00* (2020.02); *B60W 2554/802* (2020.02); *B60W 2555/20* (2020.02); *B60W 2555/60* (2020.02); *B60W 2710/1005* (2013.01); *B60W 2720/10* (2013.01)

(58) Field of Classification Search
CPC ..... B60W 2510/0676; B60W 2555/60; B60W 2710/1005; B60W 50/0097; Y02T 10/60; B01D 53/92
See application file for complete search history.

(56) References Cited

U.S. PATENT DOCUMENTS

| | | | | |
|---|---|---|---|---|
| 2018/0265090 | A1 | 9/2018 | Sharma et al. | |
| 2019/0093619 | A1 | 3/2019 | Vadlamani et al. | |
| 2019/0100208 | A1* | 4/2019 | Plianos | F02D 29/02 |
| 2019/0168753 | A1* | 6/2019 | Borhan | B60W 30/143 |
| 2019/0184996 | A1 | 6/2019 | Follen et al. | |
| 2019/0285425 | A1* | 9/2019 | Ludwick | G06Q 10/0631 |
| 2019/0338849 | A1 | 11/2019 | Chunodkar et al. | |

* cited by examiner

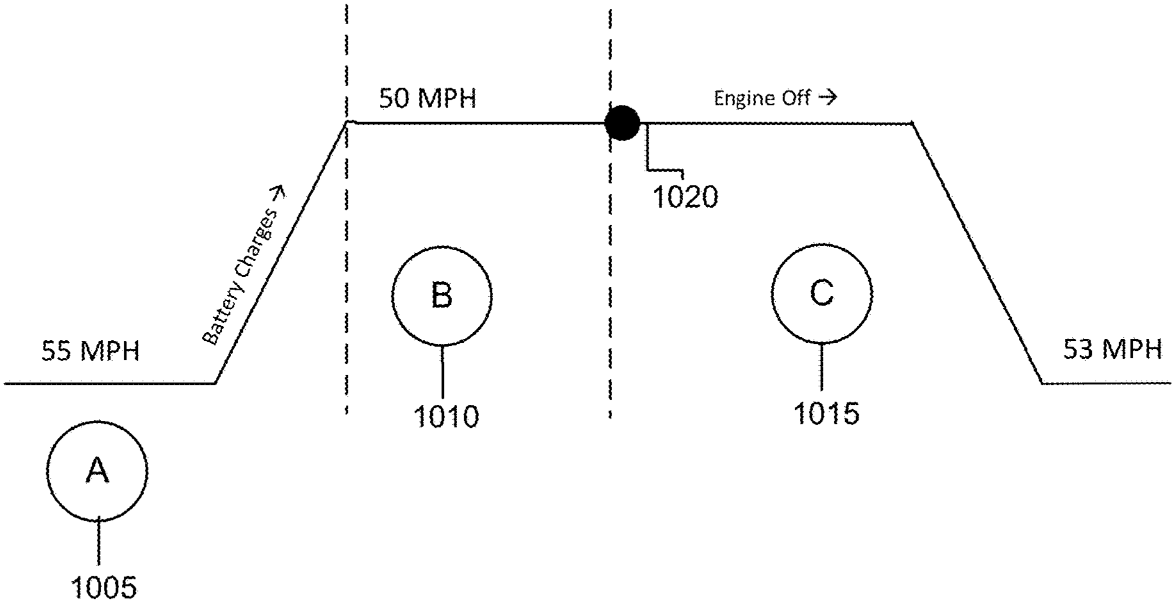

1005 — (A) Controller sets a cruise control set speed of 55 mph in anticipation of the uphill. The battery of the vehicle charges as the vehicle traverses the hill 1010 — (B) At the end of the uphill portion, the vehicle speed is 50 mph, the controller maintains the cruise control set speed of 55 mph in anticipation of the downhill.

1015 — (C) Controller turns off the engine and completely powers the vehicle using the battery after calculating that the vehicle can meet the power demand of the cruise control set speed +/- droop while the engine being off

FIG. 10

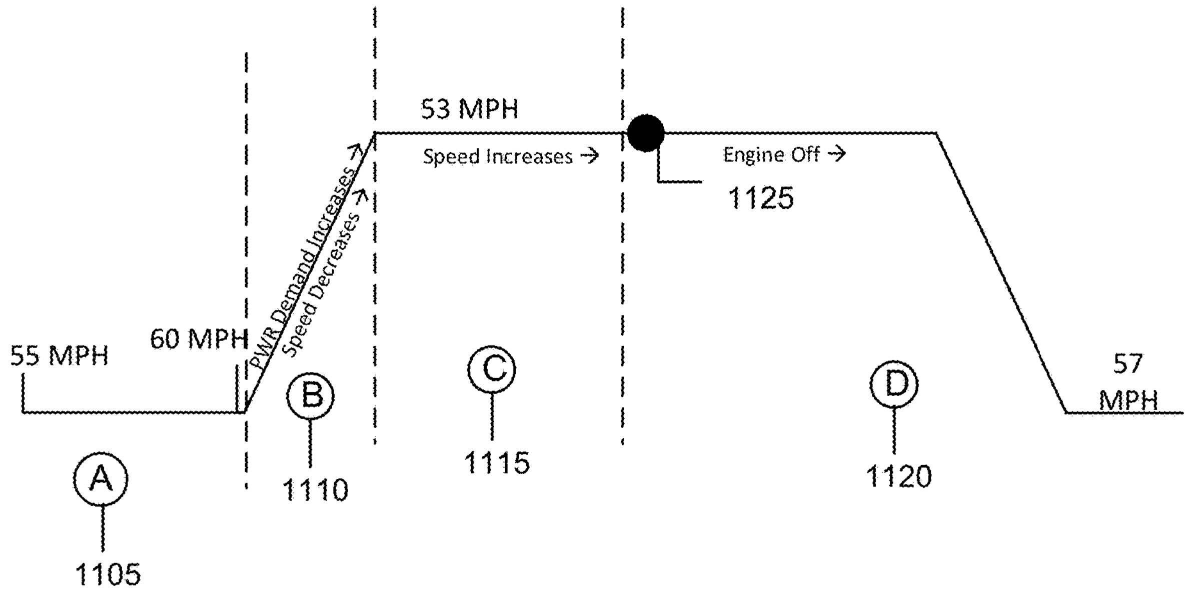

1105 — (A) Controller increases cruise control set speed from 55 mph to 60 mph in anticipation of an uphill 1110 — (B) As the vehicle traverses the uphill, the power demand for the vehicle increases and the speed of the vehicle decreases 1115 — (C) Controller decreases cruise control set speed from 60 mph to 55 mph in anticipation of the flat grade followed by a downhill 1120 — (D) Controller turns off the engine after calculating that the vehicle can meet the power demand of the cruise control set speed +/- droop while the engine being off

FIG. 11

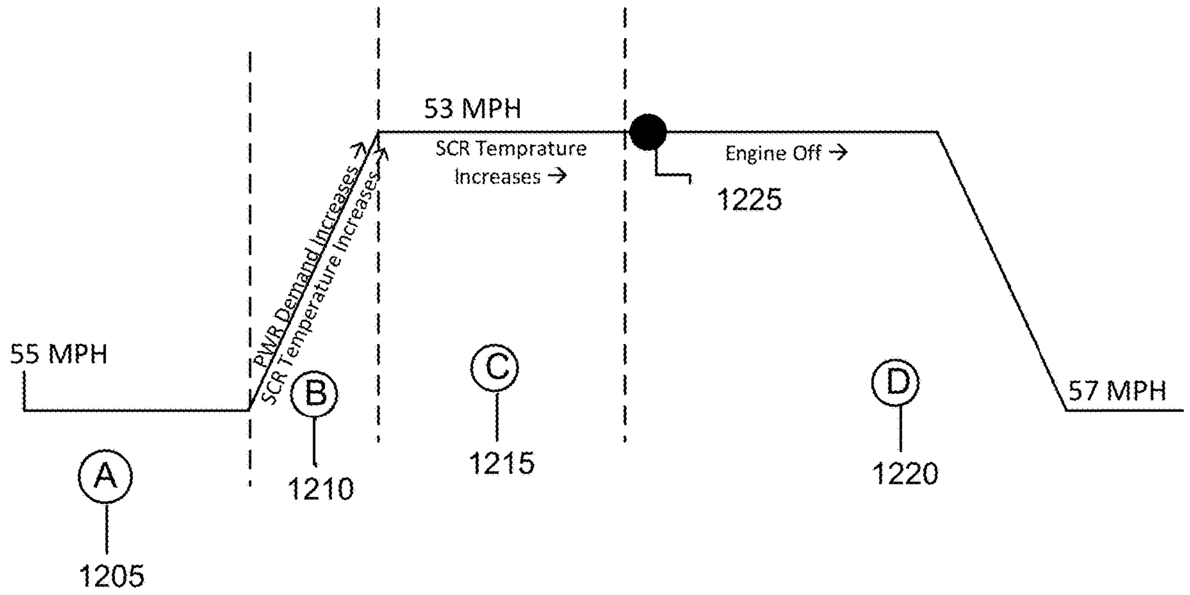
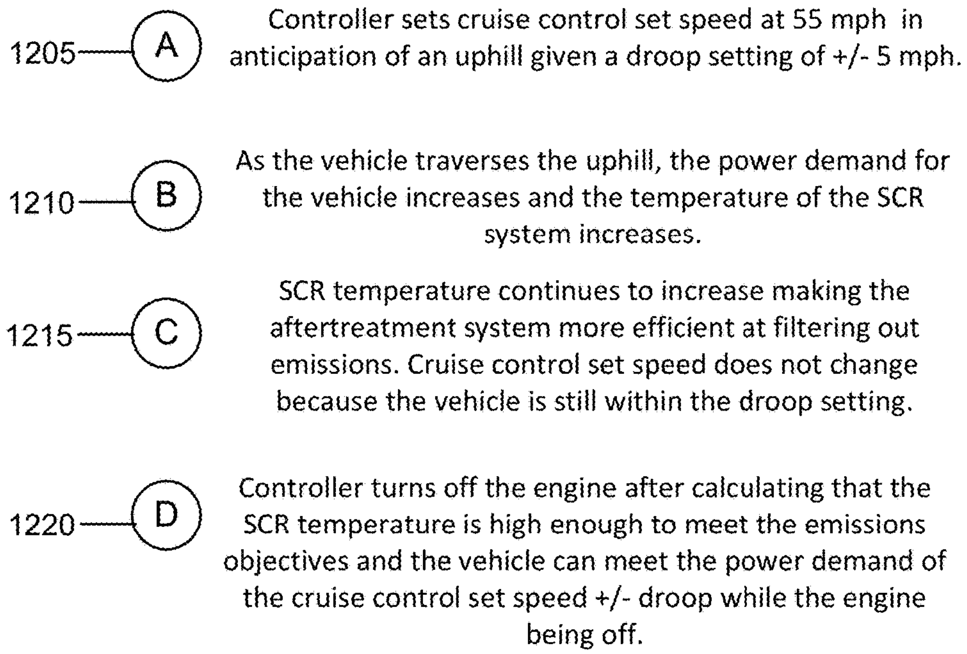
FIG. 12

SYSTEMS AND METHODS FOR PREDICTIVE ENGINE OFF COASTING AND PREDICTIVE CRUISE CONTROL FOR A VEHICLE

CROSS-REFERENCE TO RELATED APPLICATION

The present application claims the benefit of and priority to U.S. Patent Application No. 63/278,822, filed Nov. 12, 2021, which is incorporated herein by reference in its entirety and for all purposes.

STATEMENT REGARDING FEDERALLY SPONSORED RESEARCH OR DEVELOPMENT

This invention was made with Government support under DE-EE0007761 awarded by the Department of Energy (DOE). The Government has certain rights in this invention.

TECHNICAL FIELD

The present disclosure relates to systems and methods for improving predictive cruise control and predictive engine off coasting for a vehicle for achieving improved fuel economy, improved emissions characteristics, improved vehicle component life, improved vehicle performance, and/or other operational objectives.

BACKGROUND

Vehicles may be equipped with a powertrain having an internal combustion engine, a transmission with an input clutch, and optionally an electric machine and a battery (e.g., for hybrid vehicles). Vehicles may include cruise control that provides an enhanced driver experience and an improved operation of the vehicle (e.g., improved fuel economy, vehicle performance, component life, etc.). For example, vehicles with a cruise control feature may maintain the vehicle at or substantially at a predefined speed (e.g., fifty-five miles-per-hour plus-or-minus two miles-per-hour) so that the driver does not need to continuously depress an accelerator pedal of the vehicle. Vehicles may also include an engine-off feature that enables selectively turning the engine-off at sustained stops, to improve fuel economy. Engine-off features and cruise control features are separately implemented and used.

SUMMARY

One embodiment relates to an apparatus that includes one or more processing circuits having one or more memory devices coupled to one or more processors, the one or more memory devices configured to store instructions thereon that, when executed by the one or more processors, cause the one or more processors to: receive look ahead information and store the look ahead information in the one or more memory devices; receive vehicle information for a vehicle and store the vehicle information in the one or more memory devices; determine an ideal coasting opportunity for the vehicle based on the look ahead information and the vehicle information; modulate a vehicle cruise speed reference to maximize the ideal coasting opportunity; modulate an engine on/off state to maximize the ideal coasting opportunity; and determine transmission gear reference in response to an engine off state, where the transmission gear reference is configured to facilitate the transmission reengaging an input clutch to an appropriate gear based on the vehicle information.

Another embodiment relates to an apparatus. The apparatus includes one or more processing circuits comprising one or more memory devices coupled to one or more processors, the one or more memory devices configured to store instructions thereon that, when executed by the one or more processors, cause the one or more processors to: receive look ahead information and store the look ahead information in the one or more memory devices; receive vehicle information regarding operation of a vehicle including an engine; determine a coasting opportunity for the vehicle based on the look ahead information and the vehicle information; modulate a cruise control set speed based on the determined coasting opportunity; and turn the engine off during the determined coasting opportunity for the vehicle based on modulation of the cruise control set speed. The look ahead information may include one or more of a road grade, a speed limit, traffic information, or a weather condition at a particular location of a route of the vehicle. The vehicle information may include one or more of an engine state, a plurality of vehicle performance constraints, a vehicle performance objective, a vehicle accessories state, an aftertreatment system operation characteristic, a look ahead power, a look ahead velocity, a look ahead performance, or a look ahead energy requirement for the vehicle. The vehicle performance objective may be predetermined and stored within the one or more memory devices. The vehicle performance objective may be configured to dynamically change during operation of the vehicle. The instructions, when executed, may further cause the one or more processors to determine a transmission setting while the engine is turned off. The instructions, when executed, may further cause the one or more processors to provide one or more of an engine off time, an indicator of fuel consumption while the engine is turned off, or an indicator of performance of the vehicle to a user.

Another embodiment relates to a system that includes a vehicle powertrain including an engine, an electric machine including a battery and an electric machine inverter, and a transmission including an input clutch configured to facilitate a gear change. The system also includes one or more processing circuits including one or more memory devices coupled to one or more processors, the one or more memory devices configured to store instructions thereon that, when executed by the one or more processors, cause the one or more processors to: receive a set of look ahead information and store the set of look ahead information in the one or more memory devices; receive a set of vehicle information for a vehicle and store the set of vehicle information in the one or more memory devices; determine an ideal coasting opportunity for the vehicle based on the set of look ahead information and the set of vehicle information; modulate a vehicle cruise speed reference to maximize the ideal coasting opportunity; modulate an engine on/off state to maximize the ideal coasting opportunity; and determine transmission gear reference in response to an engine off state where the transmission gear reference is configured to facilitate the transmission reengaging an input clutch to an appropriate gear based on the set of vehicle information. The transmission setting may be configured to facilitate the transmission reengaging an input clutch to an appropriate gear based on the set of vehicle information. The electric machine inverter may regenerate vehicle kinetic energy to recharge the battery. The input clutch may modulate the engine on/off state by disconnecting the engine from the transmission through the input clutch. The look ahead information may include one or more of a road grade, a speed limit, traffic information, or a weather condition at a particular location of a route of the vehicle. The vehicle information may include one or more of an engine state, a plurality of vehicle performance constraints, a vehicle improvement objective, a vehicle accessories state, an aftertreatment system operation characteristic, a look ahead power, a look ahead velocity, a look ahead performance, or a look ahead energy requirement for the vehicle. The vehicle performance objective may be predetermined by a user and stored within the one or more memory devices. The vehicle performance objective may be configured to dynamically change during operation of the vehicle.

Still another embodiment relates to a method. The method includes: receiving look ahead information and storing the look ahead information in one or more memory devices; receiving vehicle information regarding operation of a vehicle including an engine; determining a coasting opportunity for the vehicle based on at least one of the look ahead information or the vehicle information; modulating a cruise control set speed based on the determined coasting opportunity; and turning the engine off during the determined coasting opportunity for the vehicle based on modulation of the cruise control set speed. The look ahead information may include one or more of a road grade, a speed limit, traffic information, or a weather condition at a particular location of a route of the vehicle. The vehicle information may include one or more of an engine state, a plurality of vehicle performance constraints, a vehicle performance objective, a vehicle accessories state, an aftertreatment system operation condition, a look ahead power, a look ahead velocity, a look ahead performance, or a look ahead energy requirement for the vehicle. The vehicle performance objective may be configured to dynamically change during operation of the vehicle. The look ahead information may include an indication of an increase in road grade relative to a current road grade for the vehicle. In response, the method may further include modulating the cruise control set speed upwards relative to a current cruise control set speed. The look ahead information may include an indication of a decrease in road grade relative to a current road grade for the vehicle. In response, the method may further include modulating the cruise control set speed downwards relative to a current cruise control set speed. In some embodiments, the method further includes bypassing turning the engine off during the determined coasting opportunity in response to the look ahead information indicating at least one of an intersection or another vehicle within a predefined distance of the vehicle Yet another embodiment relates to a method. The method includes receiving a set of look ahead information and storing the set of look ahead information in one or more memory devices; receiving a set of vehicle information for a vehicle and storing the set of vehicle information in the one or more memory devices; determining an ideal coasting opportunity for the vehicle based on the set of look ahead information and the set of vehicle information; modulating a vehicle cruise speed reference to maximize the ideal coasting opportunity; modulating an engine on/off state to maximize the ideal coasting opportunity; and determining a transmission gear reference in response to an engine off state where the transmission gear reference is configured to facilitate the transmission reengaging an input clutch to an appropriate gear based on the set of vehicle information. The look ahead information may include one or more of a road grade, a speed limit, a traffic information, or a weather condition at a particular location of a route of the vehicle. In some embodiments, the vehicle information includes one or more of an engine state, a plurality of vehicle performance constraints, a vehicle improvement objective, a vehicle accessories state, an aftertreatment system operation, a look ahead power, a look ahead velocity, a look ahead performance, or a look ahead energy requirement for the vehicle. The vehicle performance objective may be predetermined by a user and stored within the one or more memory devices. The vehicle performance objective may be configured to dynamically change during operation of the vehicle.

Another embodiment relates to a vehicle. The vehicle may include an engine and at least one controller coupled to the engine. The at least one controller may include one or more processing circuits including one or more memory devices coupled to the one or more processors, the one or more memory devices configured to store instructions thereon that, when executed by the one or more processors, cause the one or more processors to: receive, from an external information source system, look ahead information and store the look ahead information in the one or more memory devices; receive vehicle information regarding operation of the vehicle; determine a coasting opportunity for the vehicle based on the look ahead information and the vehicle information; modulate a cruise control set speed for the vehicle based on the determined coasting opportunity; and turn the engine off during the determined coasting opportunity for the vehicle based on modulation of the cruise control set speed. The instructions, when executed by the one or more processors, may further cause the one or more processors to: determine a transmission setting for the determined coasting opportunity, and command the transmission setting with a transmission of the vehicle. In one embodiment, the transmission setting is a neutral transmission setting. In some embodiments, commanding the transmission setting includes providing a prompt to an operator via an operator device to implement the transmission setting. The instructions, when executed by the one or more processors, may further cause the one or more processors to bypass turning the engine off during the determined coasting opportunity in response to the look ahead information indicating at least one of an intersection or another vehicle within a predefined distance of the vehicle. The look ahead information may include one or more of a road grade, a speed limit, traffic information, or a weather condition at a particular location of a route of the vehicle.

Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

BRIEF DESCRIPTION OF THE FIGURES

FIG. 10 is a schematic diagram of a use-case in which the controller of FIGS. 1-2 facilitates a vehicle meeting a fuel economy objective, according to an exemplary embodiment.

FIG. 11 is a schematic diagram of a use-case in which the controller of FIGS. 1-2 facilitates a vehicle meeting a fuel economy objective, according to an exemplary embodiment.

FIG. 12 is a schematic diagram of a use-case in which the controller of FIGS. 1-2 facilitates a vehicle meeting an emissions objective, according to an exemplary embodiment.

DETAILED DESCRIPTION

Figure 1:
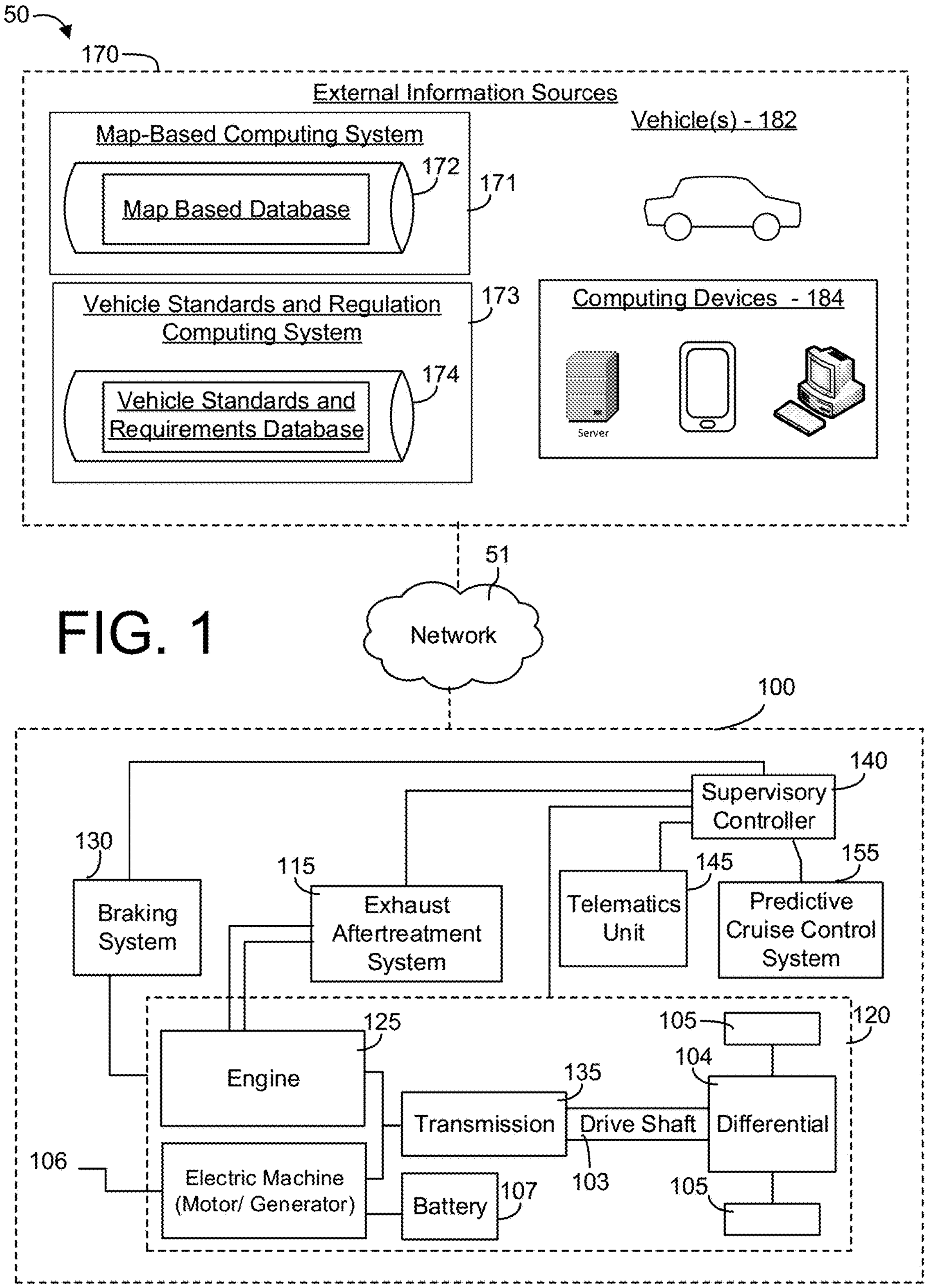
FIG. 1 is a schematic diagram of a vehicle having a predictive cruise control system in a networked or intelligent transportation system, according to an example embodiment.

Following below are more detailed descriptions of various concepts related to, and implementations of, methods, apparatuses, and systems for predictive cruise control with predictive engine off coasting to achieve various objectives for a vehicle, such as improved fuel economy. The various concepts introduced above and discussed in greater detail below may be implemented in any number of ways, as the concepts described are not limited to any particular manner of implementation. Examples of specific implementations and applications are provided primarily for illustrative purposes.

Referring to the Figures generally, various embodiments disclosed herein relate to systems, apparatuses, and methods for providing a coordinated predictive cruise control and predictive engine off coasting operating mode for a vehicle. Predictive cruise control refers to a set of vehicle controls configured to control a vehicle's cruise control speed based on current and/or look ahead vehicle operation data (e.g., road grade data ahead of the vehicle, traffic information ahead of the vehicle, etc.) and, in some embodiments, subject to one or more performance objectives (e.g., minimize fuel consumption, minimize a particular exhaust gas constituent emissions level, etc.). Predictive engine off coasting refers to a fuel saving measure implemented by a vehicle by deactivating an internal combustion engine. In operation, the engine of the vehicle is selectively turned off while operation of the vehicle is maintained (e.g., the heating, ventilation, and air-conditioning system is maintained). Coordinated predictive cruise control with predictive engine off coasting can be implemented together to meet one or more vehicle objectives (e.g., improved fuel economy, improved performance such as reducing exhaust gas emissions, improved vehicle component life, etc.).

In operation, a controller of a vehicle is configured to implement a coordinated predictive cruise control and engine off operation for the vehicle. The controller may be configured to receive look ahead information (e.g., traffic information, weather conditions, road grade conditions, zero or low emission zones, speed limits and traffic signs, vehicle proximity distance, etc.) from a variety of sources (e.g., proprietary and/or openly available sources) and use this information to determine a predicted route for a vehicle along with associated route conditions (e.g., terrain, weather on route, traffic on route, expected loads, etc.) for the predicted route or a determined route based on a user input. Based on this information, the controller is configured to determine ideal engine off coasting opportunities. An ideal engine off coasting opportunity refers to areas, times, or situations when the vehicle engine can be turned off, which may be for a predefined period of time (typically less than a predefined amount of time, such as one-minute, and more preferably less than ten seconds) and/or be based on controller feedback on certain operating parameters/conditions that are described herein, while continuing to meet one or more vehicle objectives, such as maintaining a predefined speed or a cruise control set speed). The controller may implement the ideal engine off coasting opportunity by modulating a cruise speed reference point at a current moment so that the vehicle can coast with the engine off at a designated speed within a predefined speed tolerance at a future moment (e.g., turn the engine off or otherwise disengage the engine from the driveline through the input clutch while the vehicle coasts).

As an example, the controller may identify using look ahead information that the vehicle will be traversing an uphill portion followed by a downhill portion and the driver has set the cruise speed reference to X miles-per-hour (MPH). The vehicle may also have a droop setting enabled that allows the vehicle cruise control set speed to be within a range (e.g., plus-or-minus Y MPH from the cruise control set speed). The controller may determine that in order to implement an ideal engine off coasting opportunity, the vehicle needs to speed up to X+Y MPH or X+Y+ another value MPH before beginning to traverse the hill so that the vehicle may take advantage of the momentum built up by the increased speed in order to save fuel while traversing the uphill. The controller may then modulate the cruise speed reference point to be X+Y MPH or X+Y+ another value MPH until the vehicle begins traversing the uphill. Once the vehicle traverses the uphill and begins descending a subsequent downhill portion, the controller may determine that the vehicle has sufficient momentum to coast downhill with the engine off for a certain distance, until predefined feedback from one or more sensors (virtual or physical) is received, and/or time without the vehicle's speed dropping below a predefined setting (e.g., X MPH minus the lower droop setting Y MPH). In which case, the controller may turn the engine off. Thus, in operation, the controller modulates the cruise speed reference point to selectively turn the engine off during a cruise control operating mode in order to realize various benefits, such as improved fuel economy, potentially lower overall harmful emissions, prolonged vehicle component life due to overall less usage, and so on.

In some embodiments, the controller may include an override feature (e.g., implemented via an accelerator pedal) that allows an operator to override operating mode for the vehicle. The controller may also send a notification to the user letting them know that the cruise control set speed is being modulated in order to implement an ideal engine off coasting opportunity at a future time along the route of the vehicle. For example, a light may be displayed on the dashboard of the vehicle showing that the cruise control set speed is either increasing or decreasing and by how much the speed is increasing or decreasing. The controller may maximize the ideal engine of coasting opportunity by ensuring that the engine is off as frequently and/or for as long as possible while still meeting vehicle requirements and objectives (e.g., maintaining a certain speed, meeting a certain $NO_x$ or $CO_2$ or other emission level, etc.). In some embodiments, the override feature may include a human-machine interface (HMI) that allows the user of the vehicle to decline an increase or decrease to the cruise control set speed. The override feature may include audible, visual, tactile, haptic, or other feedback modes to communicate with the user. Additionally, the override feature may be coordinated with the operator controls of the vehicle. For example, if the controller indicates a reduced cruise control set speed, the user may depress an accelerator pedal to cancel the change. Conversely, if the controller increases the cruise control set speed, the user may depress a brake pedal to cancel the change.

As described herein, an "ideal engine off" opportunity or event refers to turning the vehicle engine off or decoupling the engine from the drivetrain via a clutch or other uncoupling mechanism with little to no meaningful impact on desired operation of the vehicle (e.g., maintaining a certain predefined vehicle speed within a defined amount of acceptable speed deviation from the predefined vehicle speed, maintaining desired emission characteristics within a defined amount of one or more thresholds or ranges, maintaining desired noise levels within a defined amount of noise fluctuations from a desired threshold, etc.). Accordingly, an "ideal engine off coasting opportunity" refers to a determined opportunity to turn the vehicle engine off whereby the vehicle coasts and still meets or likely meets a desired objective, which may be a set vehicle speed. As described herein, the controller receives look ahead information and examines this information relative to a set cruise control speed to determine anticipated or potential expected operation of the vehicle based on the look ahead information (e.g., how the vehicle may slow down/up relative to a current cruise control set speed based on upcoming grade information, weather information, traffic information, etc.). Based on this determined anticipated or potential expected vehicle operation, the controller determines one or more ideal engine off coasting opportunities to beneficially conserve relatively more fuel than typically experienced under cruise control operating modes or engine off operating modes separately implemented. The systems, methods, and apparatuses described herein provide several technical benefits. More specifically, the predictive cruise control system increases a vehicle's fuel economy because less fuel is used when an ideal engine off coasting opportunity is implemented with the vehicle. Additionally, using less fuel to power the vehicle reduces the amount of regulated emissions (e.g. NOR, $CO_2$, etc.) produced by the vehicle.

Referring now to FIG. 1, a vehicle 100 having a predictive cruise control system 155 in a networked or intelligent transportation system 50 is shown, according to an example embodiment. The system 50 is shown to include a vehicle 100 coupled over a network to an external information source 170. The term "external" refers to a component or system outside of the vehicle 100.

The network 51 may be any type of communication protocol or network that facilitates the exchange of information between and among the vehicle 100 and the external information sources 170. In one embodiment, the network 51 may be configured as a wireless network. In this regard, the vehicle 100 may wirelessly transmit and receive data from the external information sources 170. The wireless network may be any type of wireless network, such as Wi-Fi, WiMAX, Geographical Information System (GIS), Internet, Radio, Bluetooth, ZigBee, satellite, radio, Cellular, Global System for Mobile Communications (GSM), General Packet Radio Service (GPRS), Long Term Evolution (LTE), light signaling, etc. In an alternate embodiment, the network 51 may be configured as a wired network or a combination of wired and wireless protocol. For example, the controller 140 and/or telematics unit 145 of the vehicle 100 may electrically, communicably, and/or operatively couple via fiber optic cable to the network 51 to selectively transmit and receive data wirelessly to and from the external information sources 170.

The external information sources 170 may be any information (e.g., data, values, etc.) provider capable of providing external information to the vehicle 100. The external information refers any information relevant to the vehicle that may be obtained from external sources. The external information source is shown to include a map-based computing system 171 including a map-based database 172, a vehicle standards and regulation computing system 173 including a vehicle standards and requirement database 174, other vehicles 182, and other computing devices or systems 184. The map based database 172 includes information including, but not limited to, road grade data (e.g., the road grade at various spots along various routes), speed limit data (e.g., posted speed limits in various road locations), elevation or altitude data at points along a route, curvature data at points along the route, locations of intersections along the route, etc. It should be understood that the present disclosure contemplates other sources of external information (e.g., a global positioning system satellite that provides latitude, longitude, and/or elevation data), such that the database configuration is not meant to be limiting or intended to be the only type of information source shown in FIG. 1. The vehicle standards and requirements database 174 may include standards and regulations relating to emissions requirements (e.g., permitted $NO_x$, greenhouse gases, CO, soot or other particulate matter, etc. in various jurisdictions or areas), noise (e.g., permitted noise requirements in various jurisdictions), and so on.

The external information source 170 may also include other vehicles 182. In this regard, the vehicle 100 may communicate with one or more other vehicles directly (e.g., via NFC, Bluetooth, wirelessly via a cellular network, other via other wireless transmission streams, etc.) to obtain data regarding one or more upcoming conditions for the vehicle 100. Additionally, the external information sources 170 may include the computing device information source 184. For example and as shown in FIG. 1, the computing device information source 184 may include one or more servers, computers, mobile devices, infrastructure components, etc. Accordingly, the external information provided by the computing device information source 184 may include, but is not limited to, a traffic density at a particular location at a particular time, a weather condition at a particular location at a particular time, etc.

The vehicle 100 may be configured as an on-road or an off-road vehicle (e.g., front end loaders, bulldozers, etc.) including, but not limited to, line-haul trucks, mid-range trucks (e.g., pick-up truck), cars (e.g., sedans), and any other type of vehicle that may utilize predictive cruise control and engine off operation. Accordingly, the vehicle 100 may be structured as an internal combustion engine driven vehicle (e.g., gasoline, diesel, natural gas or another type of fuel that is combusted and used to power the vehicle), an at least partially hybrid vehicle (e.g., parallel or series hybrid vehicle that includes one or more electric motors and one or more internal combustion engines), or a full electric vehicle (e.g., no internal combustion engine) or non-internal combustion engine (e.g., a fuel cell powertrain vehicle). The vehicle 100 is shown to include a powertrain system 120 having an internal combustion engine 125, an exhaust aftertreatment system 115, a telematics unit 145, a predictive cruise control system 155, a braking system 130, and a controller 140, which may also be referred to as a supervisory controller 140 herein. The controller 140 is communicably coupled to each of the aforementioned components.

The powertrain system 120 facilitates power transfer from the engine 125 and/or electric machine 106 to power and/or propel the vehicle 100. Thus, in the example depicted, the vehicle 100 is structured as a partially hybrid vehicle with an electrified powertrain. In other embodiments, the powertrain system is structured as a conventional non-electrified powered powertrain (e.g., no electric motors powered by one or more batteries or fuel cells to drive the vehicle). As mentioned above, this depiction is not meant to be limiting. The powertrain system 120 includes an engine 125 and electric machine 106 operably coupled to a transmission 135 that is operatively coupled to a drive shaft 103, which is operatively coupled to a differential 104, where the differential 104 transfers power output from the engine 101 and/or electric machine 106 to the final drive, which is shown as wheels 105, but may be tracks or other mechanisms in other embodiments.

The electrified powertrain includes an electric machine, which is shown as a motor generator 106, where the motor generator 106 may include a torque assist feature, a regenerative braking energy capture ability, a power generation ability, and any other feature of motor generators used in hybrid vehicles. In this regard, the motor generator 106 may be any conventional motor generator that is capable of generating electricity and producing a power output to drive the transmission 135. The motor generator 106 may include a power conditioning device such as an inverter and motor controller.

As a brief overview, the engine 125 receives a chemical energy input (e.g., a fuel such as gasoline or diesel) and combusts the fuel to generate mechanical energy, in the form of a rotating crankshaft. In comparison, the motor generator 106 may be in a power receiving relationship with an energy source, such as a battery 107 that provides an input energy (and stores generated electrical energy) to the motor generator 106 so that the motor generator 106 provides an output in form of useable work or energy to propel the vehicle 100 alone or in combination with the engine 125. As a result of the power output from at least one of the engine 125 and the motor generator 106, the transmission 135 may manipulate the speed of the rotating input shaft (e.g., the crankshaft) to effect a desired drive shaft 103 speed. The rotating drive shaft 103 is received by a differential 104, which provides the rotation energy of the drive shaft 103 to the final drive 105 to propel or move the vehicle 100.

The engine 125 may be structured as any internal combustion engine (e.g., compression-ignition or spark-ignition), such that it can be powered by any fuel type (e.g., diesel, ethanol, gasoline, etc.). In the example shown, the engine 125 is structured as a compression-ignition engine that combusts diesel fuel. Similarly, although termed a 'motor generator' 106 throughout the pages of this disclosure, thus implying its ability to operate as both a motor and a generator, it is contemplated that the motor generator unit, in some embodiments, may be an electric generator separate from the electric motor of the vehicle 100. Furthermore, the transmission 135 may be structured as any type of transmission, such as a continuous variable transmission, a manual transmission, an automatic transmission, an automatic-manual transmission, a dual clutch transmission, etc. Accordingly, as transmissions vary from geared to continuous configurations (e.g., continuous variable transmission), the transmission can include a variety of settings (e.g., gears, for a geared transmission) that affect different output speeds based on the engine speed. Like the engine 125 and the transmission 135, the drive shaft 103, differential 104, and final drive 105 may be structured in any configuration dependent on the application. Further, the drive shaft 103 may be structured as a one-piece, two-piece, and a slip-in-tube driveshaft based on the application.

The battery 107 may be configured as any type of rechargeable (i.e., primary) battery and of any size. That is to say, the battery 107 may be structured as any type of electrical energy storing and providing device, such as one or more capacitors (e.g., ultra-capacitors, etc.) and/or one or more batteries typically used or that may be used in hybrid vehicles (e.g., Lithium-ion batteries, Nickel-Metal Hydride batteries, Lead-acid batteries, etc.). The battery 107 may be operatively and communicably coupled to the supervisory controller 140 to provide data indicative of one or more operating conditions or traits of the battery 107. The data may include a temperature of the battery, a current into or out of the battery, a number of charge-discharge cycles, a battery voltage, etc. As such, the battery 107 may include one or more sensors coupled to the battery 107 that acquire such data. In this regard, the sensors may include, but are not limited to, voltage sensors, current sensors, temperature sensors, etc.

As also shown, the vehicle 100 includes an exhaust aftertreatment system 115 in fluid communication with the engine 125. The exhaust aftertreatment system 115 receives exhaust gas from the combustion process in the engine 125 and reduces the emissions from the engine 125 to less environmentally harmful emissions (e.g., reduce the $NO_x$ amount, reduce the emitted particulate matter amount, etc.). The exhaust aftertreatment system 115 may include any component used to reduce diesel exhaust emissions, such as a selective catalytic reduction catalyst, a diesel oxidation catalyst, a diesel particulate filter, a diesel exhaust fluid doser with a supply of diesel exhaust fluid, and a plurality of sensors for monitoring the system 115 (e.g., a $NO_x$ sensor, CO sensor, particulate matter sensors, exhaust gas flow and pressure sensors, ammonia sensors, etc.). It should be understood that other embodiments may exclude an exhaust aftertreatment system and/or include different, less than, and/or additional components than that listed above. All such variations are intended to fall within the spirit and scope of the present disclosure.

The braking system 130 is configured to enable the vehicle to stop movement. The braking system 130 may be coupled to the controller 140 and the predictive cruise control system 155. The braking system 130 may include any type of braking components (e.g., friction brakes, engine brakes, etc.) that may be used to control and, particularly, slow the vehicle 100. The braking system 130 may include a brake pedal used to activate a brake caliper. The caliper activates one or more brake pads to press against a disc rotor to create enough friction to slow movement of the vehicle 100.

The vehicle 100 is also shown to include a telematics unit 145 that may include, but is not limited to, a location positioning system (e.g., global positioning system) to track the location of the vehicle (e.g., latitude and longitude data, elevation data, etc.), one or more memory devices for storing the tracked data, one or more electronic processing units for processing the tracked data, and a communications interface for facilitating the exchange of data between the telematics unit 145 and one or more remote devices (e.g., a provider/ manufacturer of the telematics device, etc.) and/or external information sources 170. In this regard, the communications interface of the telematics unit 145 may be configured as any type of mobile communications interface or protocol including, but not limited to, Wi-Fi, WiMAX, Internet, Radio, Bluetooth, ZigBee, satellite, radio, Cellular, GSM, GPRS, LTE, and the like. The telematics unit 145 may also include a communications interface for communicating with the supervisory controller 140 of the vehicle 100. The communication interface for communicating with the supervisory controller 140 may include any type and number of wired and wireless protocols (e.g., any standard under IEEE 802, etc.). For example, a wired connection may include a serial cable, a fiber optic cable, an SAE J1939 bus, a CAT5 cable, or any other form of wired connection. In comparison, a wireless connection may include the Internet, Wi-Fi, Bluetooth, ZigBee, cellular, radio, etc. In one embodiment, a controller area network (CAN) bus including any number of wired and wireless connections provides the exchange of signals, information, and/or data between the supervisory controller 140 and the telematics unit 145. In other embodiments, a local area network (LAN), a wide area network (WAN), or an external computer (for example, through the Internet using an Internet Service Provider) may provide, facilitate, and support communication between the telematics unit 145 and the supervisory controller 140. In still another embodiment, the communication between the telematics unit 145 and the supervisory controller 140 is via the unified diagnostic services (UDS) protocol. All such variations are intended to fall within the spirit and scope of the present disclosure.

In another embodiment, the telematics unit 145 may be excluded and the communication interface of the controller 140 may communicate with remote systems and external information sources 170 relative to the vehicle 100 (e.g., fleet operators, external information sources 170, etc.).

The supervisory controller 140 is coupled to the powertrain 120, the aftertreatment system 115, the braking system 130, the telematics unit 145, and a predictive cruise control system 155. The supervisory controller 140 may be structured to control, at least partly, the operation of the vehicle 100. More specifically, the controller 140 may be structured to determine and implement ideal engine off coasting opportunities during various times, such as during operation of a predictive cruise control operating mode. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a CAN bus provides the exchange of signals, information, and/or data. The CAN bus includes any number of wired and wireless connections. Because the controller 140 is communicably coupled to the systems and components in the vehicle 100 of FIG. 1, the controller 140 is structured to receive information (e.g., instructions, commands, signals, values, data, etc.) from one or more of the components of the vehicle 100 shown in FIG. 1. This may generally be referred to as internal vehicle information (e.g., data, values, etc.). The internal vehicle information represents determined, acquired, predicted, estimated, and/or gathered data regarding one or more components in vehicle 100.

Accordingly, the internal vehicle information includes information regarding the battery 107 (e.g., a temperature of the battery, a current into or out of the battery, a number of charge-discharge cycles, a battery voltage, a battery state of charge, a depth of discharge, etc.), one or more fault codes, data identifiers, diagnostic trouble codes, information regarding the motor generator 106 (e.g., a power consumption rate, a power output rate, an hours of operation amount, a temperature, etc.), information regarding the powertrain system 120 (e.g., a vehicle speed, a current transmission gear/setting, a load on the vehicle/engine, a throttle position, a cruise control set speed, information relating to the exhaust aftertreatment system 115, output power, engine speed, fluid consumption rate, fuel consumption rate, diesel exhaust fluid consumption rate, any received engine/vehicle faults, a fault code indicating a low amount of diesel exhaust fluid, diagnostic trouble codes, engine operating characteristics, whether all the cylinders are activated or which cylinders are deactivated, $NO_x$ emissions, particulate matter emissions, conversion efficiency of one or more catalysts in the system 115, etc.

The internal vehicle information may be stored by the controller 140 and selectively transmitted to one or more desired sources (e.g., another vehicle such as in a vehicle-to-vehicle communication session, a V2X system, a remote operator, etc.). In other embodiments, the controller 140 may provide the internal vehicle information to the telematics unit 145 whereby the telematics unit transmits the internal vehicle information to one or more desired sources (e.g., a remote device, an operator of the telematics unit, etc.). All such variations are intended to fall within the spirit and scope of the present disclosure.

The controller 140 is coupled to a predictive cruise control system 155 that implements predictive cruise control within the vehicle 100. In some embodiments, the predictive cruise control system 155 may be configured to implement predictive cruise control with the vehicle 100 based on a determined ideal engine off coasting opportunity as determined by the supervisory controller 140. While shown as a predictive cruise control system, the cruise control system may in some embodiments be a non-predictive cruise control system and/or an adaptive cruise control system. In each of these configurations, the speed of the vehicle is controlled without a user having to manually control the vehicle speed by depressing the accelerator pedal and/or applying the brakes. Non-predictive cruise control refers to when a vehicle controller automatically controls the speed of the vehicle according to a non-predictive cruise control set speed. Adaptive cruise control is provided by the controller 140 and automatically controls the speed of the vehicle according to an adaptive cruise control set speed and the vehicle surroundings. For example, if the adaptive cruise control set speed is set to 70 MPH but another vehicle in front of the vehicle is moving at 65 MPH, then the adaptive cruise control system of the controller 140 automatically slows the vehicle (e.g., actuates the brakes) so as to maintain a minimum defined separation distance relative to the other vehicle The predictive cruise control system 155 utilizes the vehicle's route and automatically adjusts the cruise control set speed according to the route. For example, if the route includes an uphill portion, the predictive cruise control system 155 may adjust the cruise control set speed in advance of the uphill portion (i.e., increase the speed of the vehicle) in order to lower fuel expenditure while the vehicle traverses the uphill portion of the route because momentum from the increased speed at least partially carries the vehicle through the uphill portion at or substantially at the cruise control set speed to avoid typical large power expenditures during the uphill portion to maintain the set reference speed.

Thus, the predictive cruise control system 155 may control operation of the vehicle 100 based on the look ahead information and the vehicle's surroundings. For example, if the vehicle 100 may be approaching a hill, the predictive cruise control system 155 may increase the vehicle's acceleration in advance of the hill (e.g., a predefined distance in advance, such as 0.2 miles) to keep the vehicle moving at or substantially at the same speed even while the vehicle traverses the hill. In another example, the route of the vehicle, which may be predefined by an operator or based on a predetermined distance ahead of the vehicle's current location, may include a quarter of a mile of an uphill grade (e.g., a grade of a predefined percent that is defined to be uphill) followed by a downhill grade (e.g., a grade of a predefined percent that is defined to be downhill) for an eighth of a mile. In this case, the predictive cruise control system 155 may decrease acceleration at the end of an uphill region to keep the vehicle moving at the same speed as it travels down the hill. The predictive cruise control system 155 may control the vehicle's operation based on look ahead information obtained by the supervisory controller 140. The predictive cruise control system 155 may control gear shifting of the transmission 135 automatically without input from a human user, apply the braking system 130, adjust a speed of the engine 125, adjust a torque of the engine 125, etc.

As the components of FIG. 1 are shown to be embodied in a vehicle, the supervisory controller 140 may be structured as one or more electronic control units (ECU). The supervisory controller 140 may be separate from or included with at least one of a transmission control unit, an exhaust aftertreatment control unit, a powertrain control module, an engine control module, an electric machine controller, etc. In one embodiment, the depicted components of the supervisory controller 140 are combined into a single unit. In another embodiment, one or more of the components of the controller 140 (or other controllers not depicted, such as an aftertreatment system controller, etc.) may be geographically dispersed throughout the vehicle (e.g., in separate locations of the vehicle). When there are multiple controllers or components, a datalink (e.g., a J1939 communication network) or CAN bus may connect the multiple controllers to provide shared information. The datalink (or other communication structures) allows the supervisory controller 140 to recognize faults, failures, and other information from each of the connected controllers or components. The function and structure of the controller 140 is described in greater detail in FIG. 2.

Figure 2:
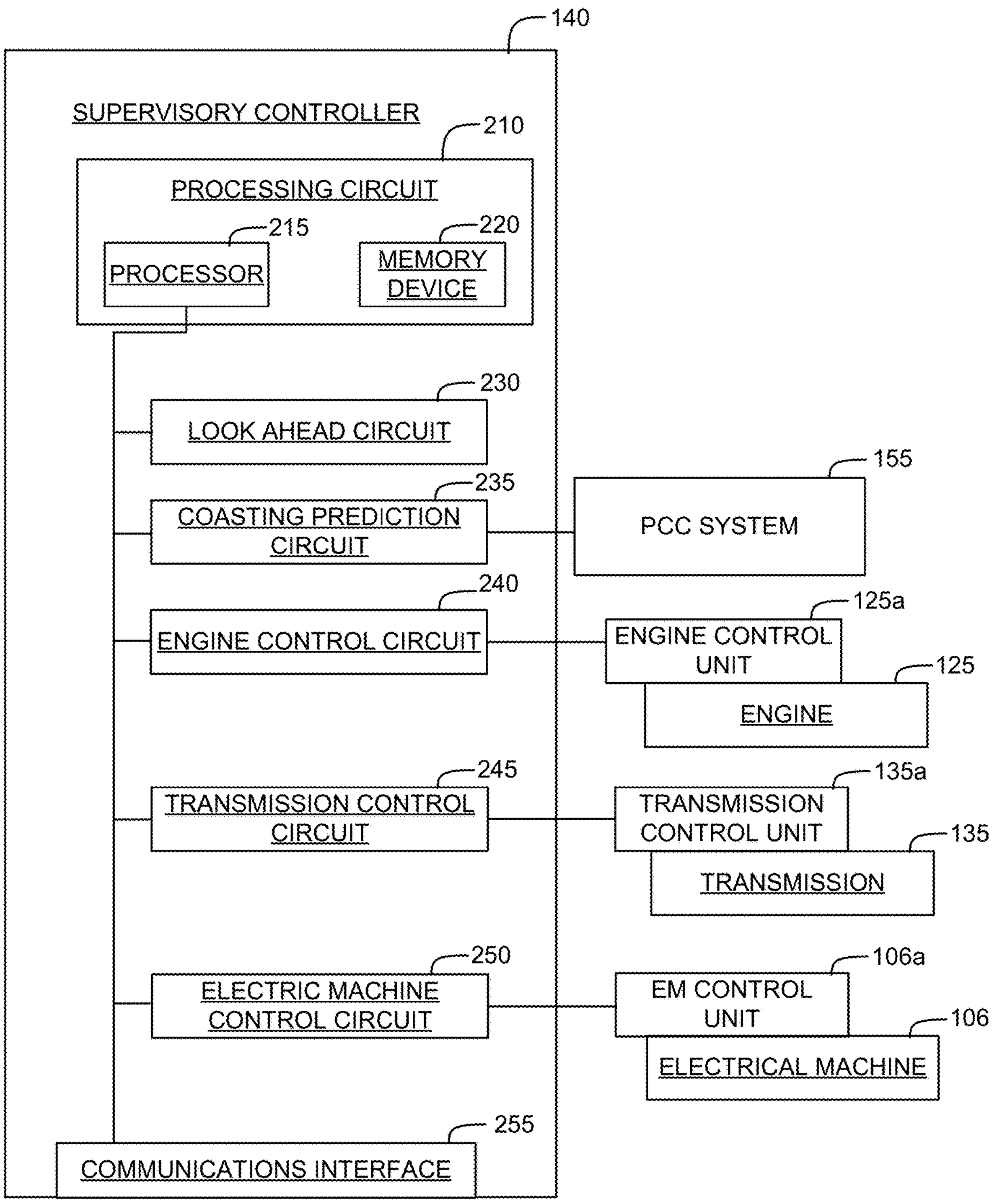
FIG. 2 is a schematic diagram of the controller of FIG. 1 coupled to various components of the vehicle of FIG. 1, according to an exemplary embodiment.

Referring now to FIG. 2, a schematic diagram of the supervisory controller 140 of the vehicle 100 of FIG. 1 coupled to an engine control unit 125*a* associated with the engine 125, a transmission control unit 135*a* associated with the transmission 135, and an electric machine control unit 106*a* associated with the electrical machine 106 is shown, according to an example embodiment. In some embodiments, the supervisory controller 140 determines control values/commands/etc. for various vehicle components (e.g., the engine 125, the transmission 135, and the electrical machine 106) and communicates these control commands to the control units for those specific vehicle components (e.g., the engine control unit 125*a*, the transmission control unit 135*a*, and the electrical machine control unit 106*a*) thus making it a "supervisory controller." In other embodiments, the engine control unit 125*a*, the transmission control unit 135*a*, and the electrical machine control unit 106*a* may be included within the supervisory controller 140 thus creating an all-in-one controller for the vehicle 100 or one or more control aspects may be combined into one or more sub-controllers as desired.

As shown in FIG. 2, the supervisory controller 140 includes a processing circuit 210 having a processor 215 and a memory or memory device 220. The supervisory controller 140 also includes a look ahead circuit 230, a coasting prediction circuit 235, an engine control circuit 240, a transmission control circuit 245, and an electric machine control circuit 250, and a communications interface 255. The controller 140 is structured to predict an ideal engine off coasting opportunity and implement the ideal engine off opportunity with the engine 125 to improve predictive cruise control for the vehicle 100. In operation, the controller 140 is configured to control vehicle components (e.g., the transmission 135, the engine 125, the electric machine 106, etc.) to implement the predictive ideal engine off coasting opportunity with the vehicle 100.

In one configuration, the look ahead circuit 230, the coasting prediction circuit 235, the engine control circuit 240, the transmission control circuit 245, and the electric machine control circuit 250 are embodied as machine or computer-readable media that stores instructions and that is executable by a processor, such as processor 215. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the look ahead circuit 230, the coasting prediction circuit 235, the engine control circuit 240, the transmission control circuit 245, and the electric machine control circuit 250 are embodied as hardware units such as electronic control units. As such, the look ahead circuit 230, the coasting prediction circuit 235, the engine control circuit 240, the transmission control circuit 245, and the electric machine control circuit 250 are may be embodied as one or more circuitry components including, but not limited to, processing circuitry, network interfaces, peripheral devices, input devices, output devices, sensors, etc. In some embodiments, the look ahead circuit 230, the coasting prediction circuit 235, the engine control circuit 240, the transmission control circuit 245, and the electric machine control circuit 250 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the look ahead circuit 230, the coasting prediction circuit 235, the engine control circuit 240, the transmission control circuit 245, and the electric machine control circuit 250 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The look ahead circuit 230, the coasting prediction circuit 235, the engine control circuit 240, the transmission control circuit 245, and the electric machine control circuit 250 may also include programmable hardware devices such as field programmable gate arrays, programmable array logic, programmable logic devices or the like. The look ahead circuit 230, the coasting prediction circuit 235, the engine control circuit 240, the transmission control circuit 245, and the electric machine control circuit 250 may include one or more memory devices for storing instructions that executable by the processor(s) of the look ahead circuit 230, the coasting prediction circuit 235, the engine control circuit 240, the transmission control circuit 245, and the electric machine control circuit 250. The one or more memory devices and processor(s) may have the same or similar definition as provided below with respect to the memory device 220 and processor 215. In some hardware unit configurations, the look ahead circuit 230, the coasting prediction circuit 235, the engine control circuit 240, the transmission control circuit 245, and the electric machine control circuit 250 may be geographically dispersed throughout separate locations in the vehicle. Alternatively and as shown, the look ahead circuit 230, the coasting prediction circuit 235, the engine control circuit 240, the transmission control circuit 245, and the electric machine control circuit 250 may be embodied in or within a single unit/housing, which is shown as the supervisory controller 140.

In the example shown, the supervisory controller 140 includes the processing circuit 210 having the processor 215 and the memory device 220. The processing circuit 210 may be structured or configured to execute or implement the instructions, commands, and/or control processes described herein with respect to the look ahead circuit 230, the coasting prediction circuit 235, the engine control circuit 240, the transmission control circuit 245, and the electric machine control circuit 250. The depicted configuration represents the look ahead circuit 230, the coasting prediction circuit 235, the engine control circuit 240, the transmission control circuit 245, and the electric machine control circuit 250 as instructions stored in non-transitory machine or computer-readable media. However, as mentioned above, this illustration is not meant to be limiting as the present disclosure contemplates other embodiments the look ahead circuit 230, the coasting prediction circuit 235, the engine control circuit 240, the transmission control circuit 245, and the electric machine control circuit 250, or at least one circuit of the look ahead circuit 230, the coasting prediction circuit 235, the engine control circuit 240, the transmission control circuit 245, and the electric machine control circuit 250, is configured as a hardware unit. All such combinations and variations are intended to fall within the scope of the present disclosure.

The processor 215 may be one or more of a single- or multi-chip processor, a digital signal processor (DSP), an application specific integrated circuit (ASIC), a field programmable gate array (FPGA), or other programmable logic device, discrete gate or transistor logic, discrete hardware components, another type of suitable processor, or any combination thereof designed to perform the functions described herein. In this way, the processor 215 may be a microprocessor, a state machine, or other suitable processor. The processor 215 also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the look ahead circuit 230, the coasting prediction circuit 235, and the engine control circuit 240 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 220 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 220 may be communicably coupled to the processor 215 to provide computer code or instructions to the processor 215 for executing at least some of the processes described herein. Moreover, the memory device 220 may be or include tangible, non-transient volatile memory or non-volatile memory. Accordingly, the memory device 220 may include database components, object code components, script components, or any other type of information structure for supporting the various activities and information structures described herein.

The look ahead circuit 230 is structured to receive and process look ahead information regarding an upcoming or likely upcoming route of the vehicle 100. The "route" may be predefined by a vehicle operator (e.g., using a mapping software such as a commercial maps program, such as Google® Maps to plan a trip) or may be defined as a predetermined distance ahead of the vehicle's 100 current location (e.g., 0.5 miles, 1.5 miles, 5 miles, etc.). The current position of the vehicle 100 may be determined by the telematics unit 145, another positioning system onboard the vehicle 100 (e.g., a GPS system), an explicit user input, a satellite positioning system, and/or some combination thereof. The route may alternatively be determined by the look ahead circuit 230 using external information sources 170 (e.g., map based database 172), the telematics unit 145, or a combination of the external information sources and the telematics unit 145. For example, the map based database 172 may include the road grade data (e.g., the road grade at various spots along various routes), speed limit data (e.g., posted speed limits in various road locations), elevation or altitude data at various points along a route, curvature data at various points along a route, location of intersections along a route and any other information that may be obtained from a map (e.g., a satellite map). In this situation, the look ahead circuit 230 may estimate or predict the route of the vehicle 100. For example, if there are no turns for one mile, the route may be determined to be one-mile ahead of the vehicle 100 because the vehicle 100 cannot (or likely cannot) diverge from this portion.

Look ahead information can also include, but is not limited to, traffic information, weather conditions, road grade conditions, road surface conditions or composition, emissions regulations zones (e.g., zero or low $NO_x$, $CO_2$, greenhouse gases, etc. emission zones), noise regulation zones, speed limits, vehicle proximity distance to other vehicles, and any other information ahead of the vehicle that may impact or affect vehicle operation. Look ahead information may be stored by the look ahead circuit 230 (e.g., stored map information regarding various roads) and/or received from one or more external information sources 170. The look ahead information may be received through the communications interface 255. In some embodiments, the look ahead circuit 230 may process the look ahead information to calculate or determine a look ahead power, velocity, energy, and/or vehicle performance requirements necessary for the vehicle 100 to meet in order to meet vehicle objectives (e.g., meeting a speed limit, maintaining a fuel economy, etc.). The look ahead circuit 230 is configured to provide look ahead information to the coasting prediction circuit 235 which may then be used to determine an ideal off engine coasting opportunity.

The coasting prediction circuit 235 is structured to determine ideal engine off coasting opportunities in coordination with the predictive cruise control system 155 in order to improve predictive cruise control for the vehicle 100 based on the received look ahead information. As mentioned above, the coordinated predictive cruise control and predictive engine off coasting may be used to meet one or more vehicle objectives (e.g., increase fuel economy, improve performance, improve emission reduction of certain exhaust gas species, increase vehicle component life, etc.). As mentioned above, the controller 140 predicts or determines the vehicle route using the look ahead information and automatically adjusts the cruise control set speed according to the determined route in order to, among potentially other benefits, conserve fuel.

In some embodiments, the coasting prediction circuit 235 may determine or receive one or more vehicle performance constraints and improvement goals that may be used to determine the ideal engine off coasting opportunity. For example, based on operating characteristics of the vehicle 100 (e.g., battery SOC, exhaust aftertreatment system temperature, etc.) and look ahead information, the coasting prediction circuit 235 may determine a load on the vehicle 100 at a current location and at a potential future location. Once the current and future load on the vehicle 100 have been determined, the coasting prediction circuit 235 may determine a future ideal engine off coasting opportunity based the predicted load. The current and future load may be determined using the formulas described herein below.

The coasting prediction circuit 235 may determine a load on the vehicle 100, a power to propel the vehicle, or another parameter affecting the ability of the vehicle 100 to coast at least one of a current location and a potential future location for the vehicle 100 based on the vehicle route. Based on the determined load, the coasting prediction circuit 235 is structured to determine the power output needed to overcome the determined load. To determine the load on the vehicle 100, or an estimated or predicted load on the vehicle 100, the coasting prediction circuit 235 may utilize one or more formulas, algorithms, processes, and the like for determining load. One such example set of formulas are shown below:

$$P_{propulsion}=P_{eng-out}=P_{aero}+P_{drag}+P_{gravity}+P_{accl}+P_{loss} \quad \text{Equation (1)}$$

In Equation (1), the power consumed for propelling a vehicle $P_{propulsion}$, is equivalent to the power from the engine 125, $P_{eng-out}$ $P_{aero}$, refers to the aerodynamic power; $P_{drag}$ refers to the power needed or substantially needed to overcome wheel drag (e.g., from road and tire interactions); $P_{accl}$ refers to the power to support acceleration of the vehicle; and, $P_{loss}$ refers to the losses that may occur and that may need to be accounted for when determining the power to propel the vehicle at various locations.

$$P_{aero}=\left(\frac{A\cdot C_D\cdot\rho\cdot u^2}{2}\right)\cdot u \quad \text{Equation (2)}$$

In Equation (2), $A\cdot C_D$ is the vehicle aerodynamic drag area (A) times the aerodynamic drag coefficient ($C_D$), which is a measure of aerodynamic resistance of a cross-sectional area. The term ρ is the air density, and the term u is the velocity or speed of the vehicle 100. The power to overcome wheel drag ($P_{drag}$) may be calculated using Equation (3).

$$P_{drag}=[(C_{rr-dyn})(m\cdot g\cdot\cos\theta)(u)+(C_{rr-static})(m\cdot g\cdot\cos\theta)](u) \quad \text{Equation (3)}$$

The term $C_{rr-dyn}$ is the wheel dynamic rolling resistance and the term $C_{rr-static}$ is the wheel static rolling resistance. The term m is the mass of the vehicle 100, the term g is the acceleration due to gravity, and the term θ is a road slope. Equation (3) may be simplified to the form of Equation (4). The power required to overcome the force due to gravity ($P_{gravity}$) may be found from Equation (4), which uses previously defined terms.

$$P_{gravity}=(m\cdot g\cdot\sin\theta)(u) \quad \text{Equation (4)}$$

The power required to accelerate the vehicle 100 includes multiple components, including the power required to accelerate the vehicle alone ($P_{veh-accl}$), the power to accelerate the wheels ($P_{whl-accl}$), the power required to accelerate the final drive 105 ($P_{FD-accl}$), the power required to accelerate the transmission 135 ($P_{TX-accl}$), and the power to accelerate the engine 125 ($P_{eng-accl}$). The calculation is shown in Equation (5).

$$P_{accl}=P_{veh-accl}+P_{whl-accl}+P_{FD-accl}+P_{TX-accl}+P_{eng-accl} \quad \text{Equation (5)}$$

Each of these terms may be individually calculated. The power required to accelerate the vehicle ($P_{veh-accl}$) may be found from the vehicle mass m, the vehicle acceleration a, and the vehicle velocity u, as shown in Equation (6).

$$P_{veh-accl}=m\cdot a\cdot u \quad \text{Equation (6)}$$

The power required to accelerate the wheels ($P_{whl-accl}$) may be found from $I_{whl}$, which is the inertia of wheels, $\omega_{whl}$, which is the angular acceleration of the wheels, and $\omega_{whl}$, which is the angular velocity of the wheels, as shown in Equation (7).

$$P_{whl-accl}=I_{whl}\dot{\omega}_{whl}\omega_{whl} \quad \text{Equation (7)}$$

The power required to accelerate the final drive 105 ($P_{FD-accl}$) may be found from $I_{FD}$, which is the inertia of the final drive 105, $\dot{\omega}_{FD}$, which is the final drive angular acceleration, and $\omega_{FD}$, which is the final drive angular velocity, as shown in Equation (8).

$$P_{FD-accl}=I_{FD}\dot{\omega}_{FD}\omega_{FD} \quad \text{Equation (8)}$$

The power required to accelerate the transmission 102 ($P_{TX-accl}$) may be found from $I_{TX}$, which is the inertia of the transmission 135, $\dot{\omega}_{TX}$, which is the transmission angular acceleration, and $\omega_{TX}$, which is the transmission angular velocity, as shown in Equation (9).

$$P_{TX-accl}=I_{FD}\dot{\omega}_{TX}\omega_{TX} \quad \text{Equation (9)}$$

The power required to accelerate the engine 125 ($P_{eng-accl}$) may be found from $I_{Eng}$, which is the inertia of engine, $\omega_{eng-out}$, which is the engine angular acceleration, and $\dot{\omega}_{eng-out}$, which as mentioned above is the engine angular velocity, as shown in Equation (10).

$$P_{eng-accl}I_{TX}\dot{\omega}_{eng-out}\dot{\omega}_{eng-out} \quad \text{Equation(10)}$$

Each of the angular velocities and angular accelerations may be derived from data provided in the vehicle parameters in conjunction with the vehicle acceleration and velocity. The final term of Equation (1), $P_{loss}$, is a summary of the losses that need to be overcome in the vehicle 100. These losses may be summarized as in Equation (11).

$$P_{loss}=P_{FD\text{-}loss}+P_{TX\text{-}loss}+P_{eng\text{-}loss} \quad \text{Equation (11)}$$

The loss from the final drive 105 ($P_{FD\text{-}loss}$) may be calculated from $\Im(\omega_{FD\text{-}in}\cdot\tau_{FD\text{-}in})$, which may be found in a lookup table of the final drive torque loss, and $\omega_{FD\text{-}in}$, which is the angular velocity of the final drive at the input, as shown in Equation (12).

$$P_{FD\text{-}loss}=\Im(\omega_{FD\text{-}in}\cdot\tau_{FD\text{-}in})\cdot\omega_{D\text{-}in} \quad \text{Equation (12)}$$

The loss from the transmission 135 ($P_{TX\text{-}loss}$) may be calculated from $\lfloor(\omega_{TX\text{-}in}\cdot\tau_{TX\text{-}in})$, which may be found in a lookup table of the transmission torque loss, and $\omega_{TX\text{-}in}$, which is the angular velocity of the transmission at the input, as shown in Equation (13).

$$P_{TX\text{-}loss}=\Im(\omega_{TX\text{-}in}\cdot\tau_{TX\text{-}in})\cdot\omega_{TX\text{-}in} \quad \text{Equation (13)}$$

The loss from the engine 125 may be calculated from $\Im(\omega_{eng\text{-}out})$, which is found in a lookup table of the engine torque loss, as shown in Equation (14).

$$P_{eng\text{-}Loss}=\Im(\omega_{eng\text{-}Out})\cdot\omega_{eng\text{-}Out} \quad \text{Equation (14)}$$

The power consumed in propelling the vehicle 100 may now be shown in terms of all the powers required, as shown in Equation (15).

$$P_{eng\text{-}out}=P_{aero}+P_{drag}+P_{gravity}(+P_{veh\text{-}accl}+P_{whl\text{-}accl}+P_{FD\text{-}accl}+P_{TX\text{-}accl}+P_{eng\text{-}accl})+(P_{FD\text{-}loss}+P_{TX\text{-}loss}+P_{eng\text{-}loss}) \quad \text{Equation (15)}$$

Even though $P_{eng\text{-}loss}$ is shown in Equation (15), it may be accounted for elsewhere. For example it may be integral to $P_{eng\text{-}out}$ and may not need to be explicitly included in Equation (15).

In accord with the above formulas, the coasting prediction circuit 235 may modulate a first or original cruise control set speed at particular locations and times (e.g., by sending a command to the predictive cruise control system 155 to modulate the cruise control set speed). For example, the controller 140 may determine that the vehicle 100 needs to meet or exceed a certain target speed that is above the original cruise control set speed before reaching an uphill portion of the vehicle route in order to traverse the uphill portion at or substantially at the original cruise control set speed. In which case, the controller 140 (particularly, the coasting prediction circuit 235) commands the predictive cruise control system 155 to increase the original cruise control set speed (i.e., an increase of the set speed from the first or original predefined set speed) of the vehicle 100 to a target speed. The target speed may be a speed or velocity needed for the vehicle 100 to traverse the uphill portion (or another portion of the route) without increasing (or decreasing) a power output from the vehicle 100 beyond a predefined amount so to avoid large power excursions (drops), and associated fuel consumption events. Thus, the target speed associated with a location and time ahead of the current vehicle location. The target speed may be the same, different, or within a predefined amount (e.g., 2 MPH) of the original cruise control set speed. If the target speed is the same as the original cruise control set speed, the controller 140 may not modulate the original cruise control set speed. If the target speed differs from the original cruise control set speed by more than a predefined amount (e.g., more than 2 MPH), then the controller 140 may command the predictive cruise control system 155 to modulate or change the original cruise control set speed to an updated cruise control set speed. The target speed may be determined based on the expected future load at the future location at a future time using the formulas above or other formulas/processes. Staying with the example described above of the vehicle 100 traversing an uphill portion of the vehicle route and with the built up momentum from the updated cruise control set speed (in the event the target speed was higher than the original cruise control set speed), the vehicle 100 may not need to expend relatively large power outputs during traversal of the uphill portion. Further, if the vehicle route includes a relatively flat or a downgrade portion following the uphill portion and because momentum is keeping the vehicle 100 at the original cruise control set speed, the controller 140 may command the predictive cruise control system 155 to modulate the updated cruise control set speed back to the original cruise control set speed and simultaneously command the engine 125 (e.g., via the engine control unit 125*a*) to turn off so that the vehicle 100 coasts while the vehicle's speed returns to the original cruise control set speed (plus or minus predefined cruise droop settings). Here, the controller 140 implements an engine off event during cruise control while the vehicle 100 returns to its original cruise control set speed to further increase fuel savings.

In some embodiments, the coasting prediction circuit 235 determines a look ahead power, a look ahead speed, a look ahead energy, and/or look ahead performance requirements based on the predicted future requirements to maintain the cruise control set speed. The look ahead power can include a power required at a future point or location on the vehicle route determined using the look ahead information and the current vehicle information including parameters determined using the above equations. The look ahead speed can include a speed predicted at the future location on the vehicle route based on the look ahead information and the current vehicle information including parameters determined using the above equations. The look ahead energy can include an energy required to overcome static and dynamic forces (drag, uphill grade, downhill grade, wind, temperature, look ahead information, etc.) affecting the vehicle 100 during travel over the vehicle route and/or an energy required to be produced by the engine 125 to achieve the cruise control set speed of the vehicle 100. The look ahead performance requirements can include upcoming speed limits, traffic slowdowns, road grade, noise requirements, emissions requirements, fleet platooning opportunities, etc.

It should be understood that the above formulas represent only one example methodology for determining the power to propel the vehicle 100. In other embodiments, additional and/or different power determination methodologies may be employed with all such variations intended to fall within the scope of the present disclosure (e.g., formulas that take into account various dynamic conditions, such as wind speed, traffic conditions, etc.). Further, these formulas may be represented in one or more look-up tables stored by the controller 140 or within a machine learning engine or architecture implemented by the controller 140 to facilitate relatively fast determinations.

It should also be understood that while the predictive cruise control system 155 is shown separate from the supervisory controller 140, in some embodiments, the control functionality of the predictive cruise control system 155 is included with the controller 140. In which case, the controller 140 may directly control, command, and/or otherwise manage one or more vehicle systems (e.g., engine 125, transmission 135, etc.) to control the speed of the vehicle 100.

The engine control circuit 240 is structured to control the engine 125. More specifically, the engine control unit 125*a* implements control commands determined and provided by the engine control circuit 240 with the engine 125. For example, the engine control circuit 240 may determine an engine off command, an engine speed value command, an engine torque value command, a dynamic skip-fire command, etc. for the engine 125 in order to implement an engine off coasting opportunity. In this case, the engine control circuit 240 communicates the engine off command to the engine control unit 125*a* which implements the engine off command with the engine 125.

The transmission control circuit 245 is structured to control the transmission 135. More specifically, the transmission control unit 135*a* implements control commands, values, etc. determined by the transmission control circuit 245 with the transmission 135. For example, the transmission control circuit 245 may determine a transmission setting (e.g., neutral, a different gear or setting, etc.) to implement an ideal engine off coasting opportunity. In one embodiment, the transmission setting is a neutral setting for the engine off coasting event. In this case, the transmission control circuit 245 may communicate the particular gear or setting to the transmission control unit 135*a* which implements the gear or setting reference point with the transmission 135. In other embodiments, the transmission control circuit 245 may prompt an operator to shift to the particular gear or setting during predictive cruise control operating mode (e.g., a graphical user interface on a display device that indicates textually to shift to the particular setting, or an audible command may be provided, an audible and textual prompt, etc.). The transmission control unit 135*a* may control other aspects of operation of the transmission 135 in addition to manage a transmission gear setting, such as facilitating an ideal transmission fluid temperature reference point, etc. For example, the transmission fluid temperature reference point may be set to any value between 175-224° F. to ensure that the transmission 135 is operating in an ideal temperature range.

The electric machine control circuit 250 is structured to control electric machine 106. More specifically, the electric machine control circuit 250*a* implements the electric machine control commands, values, instructions, etc. determined by the electric machine control circuit 250 with the electric machine 106. For example, the electric machine control circuit 250 may determine a power output from the electrical machine 106 to reduce a power excursion of more than a predefined amount from the engine 125 while still maintaining a first cruise control set speed to subsequently have the engine control circuit 240 turn the engine 125 off (i.e., to implement and realize an ideal coasting opportunity).

As described herein, the coasting prediction circuit 235 may work in conjunction with the engine control circuit 240, the transmission control circuit 245, and the electric machine control circuit 250 to provide control points (e.g., control commands, instructions, etc.) to the engine control unit 125*a*, the transmission control unit 135*a*, and EM control unit 106*a* in order to implement the engine off coasting opportunity within the vehicle 100 and, particularly, during a cruise control mode of operation for the vehicle 100. The EM feature may be implemented with at least partially hybrid vehicles.

As an example of operation, the controller 140 of the vehicle 100 may implement an ideal engine off coasting opportunity based on the proximity and/or closing rate between the vehicle 100 and at least one of a trailing vehicle(s) or a lead vehicle(s). A lead vehicle may be defined as a vehicle ahead of the vehicle 100. In some embodiments, a lead vehicle may be a predetermined vehicle such as when a fleet of vehicles are traveling together (i.e., determined by a fleet operator). In other embodiments, a lead vehicle may refer to another selected vehicle that is in front of the vehicle. A following distance may be defined as the distance between the vehicle 100 and the lead vehicle. The closing rate refers to the rate at which the vehicle 100 lessens/reduces the following distance to the lead vehicle (e.g., in X seconds, the vehicle will overcome the lead vehicle, X distance/time the following distance is being reduced/lessened). Alternatively, if the vehicle 100 is the lead vehicle, the closing rate is the rate at which a trailing vehicle closes the following distance to the vehicle 100.

As a specific example, the controller 140 of the vehicle may implement an ideal engine off coasting opportunity and keep the engine in an off state based on the following distance to a lead vehicle or a closing rate to the lead vehicle being above a predefined threshold. For example, if a following distance is above a predefined threshold (e.g., greater than 500 feet, greater than 100 feet, etc.), the controller 140 may determine to turn the engine back on to shorten the following distance. In this case, the controller 140 may selectively turn on/off the engine to maintain a predefined following distance of the vehicle 100 to a predefined lead vehicle. Alternatively, if a predefined following distance is not provided (e.g., by a fleet operator, by the operator/driver via a touchscreen on the vehicle, etc.), then the controller 140 may implement an engine off coasting event in response to the following distance to a selected lead vehicle being greater than a predefined following distance. In this example, the controller 140 is not attempting to keep the vehicle 100 within a predefined distance of the lead vehicle. As still another example, the controller 140 may selectively turn off the engine when the vehicle 100 is within the predefined distance of the lead vehicle (e.g., within 500 feet). In this instance, the controller 140 may have received a predefined desired distance that the vehicle 100 is to be within the lead vehicle. In which case, the controller 140 may enable engine off coasting opportunities when the vehicle 100 is within the predefined distance of the lead vehicle. Similarly, the controller 140 may also use and determine a closing rate of the vehicle 100 to a lead vehicle. If the closing rate is below a threshold (e.g., less than 10 seconds, 3 seconds, etc. until the vehicle 100 will or likely will overtake the lead vehicle), the controller 140 may turn the engine off in order to maintain the order of the lead vehicle being in front of the vehicle. If the closing rate is above the threshold, the controller 140 may turn the engine on in order to maintain a predefined desired closing rate relative to the lead vehicle.

In operation, the communications interface 255 of the controller 140 may communicate with a communications interface of a lead and/or trailing vehicle to detect the lead and/or trailing vehicle, and determine a proximate location of the lead and/or trailing vehicle. The position information may be used to determine following distances and/or closing rates. Alternatively, GPS or other satellite information regarding the trailing and/or lead vehicle may be used by the controller 140 to determine a following distance and/or closing rate. As another example, the vehicle 100 may include one or more sensors (e.g., LIDAR, radar, etc.) that detect trailing/lead/proximate vehicles within a predefined distance of the vehicle 100 with such information being used by the controller 140 to determine following distances, separation distances, and/or closing rates.

Based on the foregoing and in some embodiments, the controller 140 may implement an ideal engine off coasting opportunity based on the proximity of the vehicle 100 to a trailing vehicle (e.g., a vehicle behind the vehicle) plus a minimum set speed (e.g., a minimum cruise control set speed or other desired minimum speed). In this example, the controller 140 is selectively implementing an engine off coasting event responsive to a trailing vehicle (i.e., the vehicle 100 is the lead vehicle). In operation, the controller 140 may examine/analyze dynamic information, such as traffic information including one or more trailing vehicles. The controller 140 may determine an ideal engine off coasting opportunity based on the following distance between the vehicle 100 and the trailing vehicle and a minimum set speed of the vehicle (which may be a set cruise control speed). As a specific example and in the absence of detecting a trailing vehicle, the controller 140 may implement the ideal engine off coasting opportunity until the vehicle reaches (i.e., drops to) the minimum set speed. When the minimum set speed is reached or the vehicle 100 goes below this minimum set speed (based on a reading/measurement from the vehicle speed sensor), the controller 140 may turn the engine on to power the vehicle 100 to a speed above the minimum set speed. Beneficially, this configuration prolongs engine off coasting events until the vehicle reaches or goes below a minimum set speed. On the other hand, if a trailing vehicle is detected behind the vehicle, then the controller 140 may implement the ideal engine off coasting opportunity until the controller 140 detects one or more thresholds and/or conditions, such as until the controller 140 detects a speed of the vehicle 100 going below a predefined minimum speed, the controller 140 detects the trailing vehicle getting within a predefined following distance, the controller 140 detects the closing rate going below a threshold amount, and/or the controller 140 detects a traffic buildup. The controller 140 may determine that these situations indicate a buildup of traffic and, in turn, the controller reactivates the engine to power the vehicle at or above the minimum set speed (assuming traffic permits). This may be advantageous so to avoid causing traffic buildups.

Traffic buildups may be determined by the controller 140 in a variety of ways. For example, traffic buildups may be determined by the controller 140 based on information received from a remote server. For example, the remote server may provide traffic information to the controller 140 indicating the detection of nearby vehicles over a predefined amount of time (e.g., 2 vehicles within a predefined distance and predefined time ago of the vehicle compared to 6 vehicles within the predefined distance of the vehicle currently may demonstrate a buildup in traffic). As another example, the controller 140 may determine that the amount of time the vehicle has spent in a similar position exceeds a threshold (e.g., within a 0.1 mile radius for over 5 minutes on a road with a 75 MPH speed limit may demonstrate a buildup in traffic).

In some embodiments, the controller 140 may use a first minimum set speed when there are no trailing vehicles within a predefined distance of the vehicle 100 and a second minimum set speed when there is a trailing vehicle(s) within a predefined distance of the vehicle 100. The first minimum set speed may be lower than the second minimum set speed. In this way, the controller 140 allows the vehicle to go slower when trailing vehicle(s) are outside of a predefined distance of the vehicle 100 so to minimize potential traffic buildups.

Figure 3:
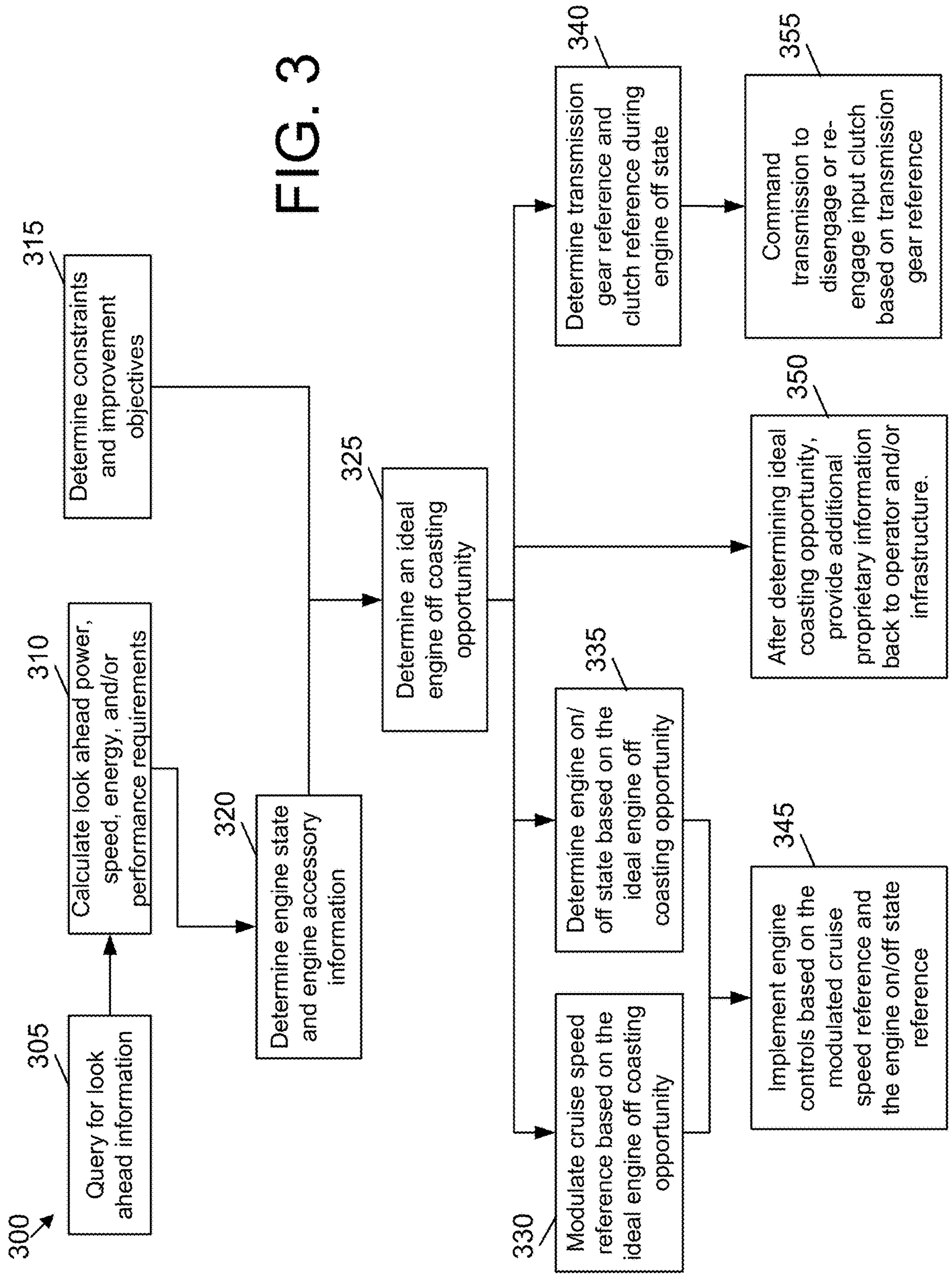
FIG. 3 is a flow diagram of a method of implementing a predictive engine off coasting control strategy by the controller of FIGS. 1-2, according to an exemplary embodiment.

Referring now to FIG. 3, a method 300 of operating the vehicle 100 with the controller 140 is shown, according to an example embodiment. It should be understood that method 300 is being performed during a cruise control operating mode for the vehicle 100. Accordingly and not shown, the method 300 includes receiving a first or original cruise control set speed (e.g., from an input from the operator for the vehicle 100, from a remote operator (e.g., for fleet controlled vehicles or for autonomous vehicles), etc.).

Based on the foregoing, at process 305, the controller 140 queries and receives the look ahead information. As mentioned herein, the look ahead information may include, but is not limited to, traffic information, weather conditions, road grade conditions, emissions regulations zones (e.g., zero or low $NO_x$, $CO_2$, greenhouse gases, etc. emission zones), speed limits, vehicle proximity distance to other vehicles, and any other information ahead of the vehicle that may impact or affect vehicle operation. The look ahead information received by the controller 140 can be obtained from a combination of proprietary and openly available information sources.

At process 310, the controller 140 determines one or more of a look ahead power, a look ahead speed, a look ahead energy, and look ahead performance requirements for the vehicle 100. The look ahead power, look ahead speed, look ahead energy, and look ahead performance requirements are energy/power targets that the vehicle aims to meet while determining ideal engine off coasting opportunities for the vehicle 100. For example, if the vehicle 100 is driving on a highway with a speed limit of 65 miles per hour, then the controller 140 may determine that the look ahead speed of the vehicle 100 will be approximately 65 miles per hour and the controller 140 aims to maintain this speed with predictive cruise control even while determining and implementing ideal engine off coasting opportunities. The look ahead speed may be obtained from an external information source (e.g., external information sources 170). In other embodiments, the look ahead speed may be preset by a user.

At process 315, the controller 140 determines at least one constraint and/or an objective for the vehicle 100. The constraint may define limits or capabilities of the system and include one of a maximum transmission setting, a maximum engine speed, a maximum engine torque, a maximum engine temperature, a maximum electrical machine power output, a maximum allowable emission level, etc. The vehicle objective may include a goal or other objective regarding performance of the vehicle 100, and include at least one of maintaining (e.g., meeting or exceeding) a predefined vehicle speed value, meeting or exceeding a certain fuel economy (e.g., a predefined miles-per-gallon threshold), meeting a certain emissions standard or regulation, a combination thereof, etc.

The constraint and objective may be configured to ensure or substantially ensure that the vehicle 100 operates within certain parameters while determining and implementing ideal engine off coasting opportunities. For example, the vehicle 100 may have constraints such as speed constraints, engine power constraints, etc. Additionally, the vehicle 100 may also have performance objectives such as fuel efficiency, component life increase improvement, emission reduction, etc. In some embodiments, the performance objectives and/or constraints may be preset by a manufacturer and stored in and retrieved from the memory device 220. In some embodiments, the performance objectives and/or constraints may be input by the user. In some embodiments, the performance objectives and/or constraints may change dynamically throughout the operation of the vehicle 100. In some embodiments, the performance objective may be displayed to the user through a vehicle dashboard (e.g., a message or icon light shown on the dashboard of the vehicle 100). In still other embodiments, the performance objectives and/or constraints may be obtained from outside data sources (e.g., a remote operator such as a fleet operator, other external information sources 170, etc.) or some combination thereof, etc.

At process 320, the controller 140 determines engine state and vehicle accessory information (e.g., radiator fan engaged, a/c compressor engaged, regenerative braking active/inactive, etc.). Engine state and vehicle accessory information refer to current operating characteristics of the engine 125 and vehicle accessories (e.g., heating, ventilation, and air conditioning system). Other internal vehicle information may also be included, such as aftertreatment system operation characteristics. Operating characteristics of the aftertreatment system 115 may include, but are not limited to, $NO_x$ conversion efficiency, component temperatures, exhaust gas temperature, exhaust gas flow rate, presence or absence of diagnostic trouble codes, etc. Engine state information may include but is not limited to engine fueling information (e.g., rate, amount, etc.), engine temperature, engine torque, engine power output, presence or absence of diagnostic trouble codes, etc.

At process 325, the controller 140 determines an ideal engine off coasting opportunity taking into account the information obtained or otherwise determined at processes 305-325. More specifically, the controller 140 determines an ideal engine off coasting opportunity based on information and data regarding the vehicle 100 including powertrain capability, battery state (e.g., state of charge, state of health, etc.), vehicle objectives, vehicle constraints, and/or look ahead information. For example, the controller 140 may determine an ideal engine off coasting opportunity by utilizing vehicle kinetic energy or potential kinetic energy (e.g., current speed, upcoming downhill portion of the route, mass of the vehicle, etc.) in a way that decreases the overall system energy loss and improves powertrain efficiency while meeting performance constraints. In one embodiment, a current load on the vehicle 100 at a current location may be determined as described above with the aforementioned formulas/equations. Additionally, a future load on the vehicle 100 at a future location at a future time may also be predicted, determined, or otherwise estimated as described above using the same or similar formulas. The controller 140 may then analyze the current load and the predicted future load to determine if the vehicle 100 has sufficient momentum given the current load to turn off the engine (i.e., implement an ideal engine off coasting opportunity) for a certain distance or time at the future location and at the future time while still meeting the predicted power demand/load at the future location and time.

More specifically, the controller 140 may use Equations 1-15 (or other processes) to determine the current load (e.g., the power consumed for propelling the vehicle 100, $P_{propulsion}$) for the vehicle 100 based on the current state of the vehicle 100 (e.g., current speed, current acceleration, weight of the vehicle 100, current road grade etc.). The controller 140 may then use Equations 1-15 (or other processes, formulas, tables, etc.) to determine the future load or future state (e.g., future power demand for propelling the vehicle at a certain speed) for the vehicle 100 based on the current state of the vehicle 100 and the look ahead information (e.g., current speed of the vehicle, current acceleration, predicted speed of the vehicle, weight of the vehicle, predicted road grated, look ahead road contour information, look ahead wind information, look ahead precipitation information, look ahead weather information, look ahead traffic information, look ahead platoon information, etc.). The future load or future state of the vehicle 100 may be used by the controller 140 to achieve one or more objectives subject to one or more constraints. For example, the objective and constraint may include a maximized engine off time (e.g., maximize the number of times the engine is turned off, maximize the time of an engine off event each time the engine is turned off, etc.) and the future load or future state are used by the controller 140 to determine and manipulate operation of the vehicle 100 to achieve the objective and constraints. In other words, the predicted future state (e.g., based on the current state and the look ahead information) can be used to control the vehicle 100 so that the predicted future state is desirable (e.g., meets the objective subject to one or more constraints) such that a desired future state is achieved by the vehicle 100. Exemplary objectives and constraints are discussed below with specific examples. Other objectives and constraints exist and can be achieved via the use of controller 140 and the control architectures described herein.

Once the current power load and the future power load have been determined, the controller 140 may then determine the difference in power load between the current power load and the future power load in order to determine if the engine 125 can be turned off at the future location and still meet or substantially meeting the future power demand. For example, the vehicle 100 may be approaching an uphill portion of the vehicle route. At the beginning of the uphill, the controller 140 may determine that the vehicle 100 has a current power demand that is lower than a predicted future power demand for the vehicle 100. In this case, the controller 140 may determine that transitioning from the current power demand to the predicted future power demand may not be possible if the engine 125 is turned off. Therefore, the controller 140 determines that this is not an ideal engine off coasting opportunity. On the other hand, the vehicle route may include a downhill portion immediately following the uphill portion. At the end of the uphill portion, the controller 140 may determine that current power demand for the vehicle 100 is much higher (e.g., more than a threshold amount) than the predicted power demand of the vehicle 100 once the vehicle 100 starts heading downhill. In this case, the controller 140 may determine that meeting the predicted future power demand may be possible at a future location even if the engine 125 is turned off. Therefore, the controller 140 would determine that this is an ideal engine off coasting opportunity and turn off the engine 125.

With respect to the cruise control mode of operation, the controller 140 may determine a target speed for the vehicle 100 relative to the set cruise control speed in order to maintain or substantially maintain the set cruise control speed at a certain portion of the vehicle route. The controller 140 may use the formulas/processes/equations/etc. described above to make this determination. In this regard, the controller 140 may determine that the vehicle 100 needs to be moving at a certain target speed in order to implement an ideal engine off coasting opportunity, and as such the controller 140 may modulating the cruise control set speed to meet that certain target speed. As described above, the controller 140 determines an ideal engine off coasting opportunity by determining a current power load of the vehicle 100, a future power load of the vehicle 100, and determining if the engine 125 can successfully transition from meeting the current power load of the vehicle 100 to meeting the future power load of the vehicle 100 while the engine 125 is turned off. Based on the determined an ideal engine off coasting opportunity, the controller 140 implements the ideal engine off coasting opportunity during predictive cruise control vehicle operation at processes 330-355.

At process 330, the controller 140 modulates the cruise control set speed based on the ideal engine off coasting opportunity determined at 325. In this way, the controller 140 may adjust the first or original cruise control set speed upwards or downwards in order to enable an engine off coasting event at some point in the future along the vehicle route. For example, the cruise control set speed may be increased based on the route conditions in order to enable an ideal engine off coasting opportunity. For example, look ahead information may indicate a slightly raised road grade along the vehicle route for the next 2 miles. Comparing the current power demand of the vehicle 100 and the future power demand of the vehicle 100 based on the slightly raised road grade, the controller 140 may determine that in order to implement an ideal engine off coasting opportunity, the cruise control set speed needs to be increased by X MPH over the next two miles. In other embodiments, the cruise control set speed may be decreased based on the route conditions in order to enable an ideal engine off coasting opportunity. For example, in certain conditions (e.g., a neighborhood with frequent stop signs, stop and go traffic, low visibility based on weather conditions, etc.), the vehicle 100 may conserve fuel by driving slower to prevent braking and accelerating aggressively. In this case, controller 140 may lower the cruise control set speed in order to help them conserve fuel. In some embodiments, the user of the vehicle 100 may be given a notification (e.g., a light indicator, written message, spoken message, etc.) that the cruise control set speed is being modulated in order to implement an ideal engine off coasting opportunity. The user may then have the opportunity to override or cancel the modulated cruise control set speed.

At process 335, the controller 140 determines an engine on/off state, which may include disengaging the engine 125 from to the driveline through actuation of an input clutch to maximize the ideal engine off coasting opportunity determined at process 325. Maximizing the ideal engine off coasting opportunity refers to turning the engine off for as long as possible while still meeting the power demands of the vehicle, maximizing the frequency of engine off events, or a combination of frequency and duration of engine off events.

At process 345, the controller 140 commands the powertrain (e.g., engine and transmission) based on the modulated cruise control set speed and the determined on/off state for the engine 125. In this regard, when the cruise control set speed is modulated, the controller 140 may increase or decrease the engine speed (in some embodiments, power output) to achieve or attempt to achieve the modulated cruise control set speed. Additionally, the controller 140 may further adjust a transmission 135 setting to enable the new speed. For example, a transmission shift schedule may define vehicle speeds for associated engine and transmission speeds. Based on the current engine speed, transmission setting, and the determined modulated cruise control set speed, the controller 140 may implement engine speed along with transmission changes to achieve the desired modulated cruise control set speed.

At process 340, the controller 140 determines a transmission gear reference and a transmission clutch control command or reference during an engine off state based on the ideal engine off coasting opportunity determined at process 325. In some embodiments, the transmission gear reference refers to a particular transmission gear. In some embodiments, the vehicle 100 may include an automatic transmission 135, so the transmission gear reference may be directly implemented with the powertrain system 120 by the controller 140. In other embodiments, the vehicle 100 may include a manual transmission 135, so the transmission gear reference may be communicated to the user who may then modulate the gear of the vehicle 100 to match the gear of the transmission gear reference. The transmission clutch control command refers to a transmission clutch control input such as when to engage and disengage the transmission clutch. When an ideal engine off coasting opportunity is determined, the controller 140 may determine how one or more components of the vehicle 100 may be modulated in order to implement the ideal engine off coasting opportunity. For example, if an ideal engine off coasting opportunity is determined at the top of an uphill part of a route, the transmission clutch may need to disengage from the engine 125 to turn the engine off in order to implement the ideal engine off coasting opportunity. As another example, if an ideal engine off coasting is determined at the beginning of a downhill, the vehicle 100 may need to operate in a lower gear in order to implement the ideal engine off coasting opportunity.

At process 355, the controller 140 commands the transmission 135 to implement the transmission gear and clutch reference in order to implement the ideal engine off coasting opportunity. For example, the controller 140 may provide a transmission gear reference and a transmission clutch reference during an engine off event so that at the end of the engine off event, the transmission 135 re-engages the input clutch in the appropriate gear based on performance, emissions, and fuel economy demands while minimizing frequent neutral/gear shifts.

At process 350, the controller 140 provides additional information back to the operator and/or infrastructure after determining and implementing the ideal engine off coasting opportunity. The additional information may include an engine off time, a relative change in the vehicle performance objective, changes in performance objectives when changing performance constraints, and/or other information relating to implementing the engine off event during predictive cruise control operation of the vehicle 100. For example, after implementing an ideal engine off coasting opportunity, the controller 140 may provide an amount of fuel saved compared similar vehicle operation but without implementing an ideal engine off opportunity. This additional information may be proprietary and be used to help determine future ideal engine off coasting opportunities for the vehicle 100.

In some embodiments, processes 345, 350, and 355 are implemented by the controller 140 simultaneously, concurrently, and/or during overlapping time frames. In other words, the processes 345, 350, and 355 may occur in parallel. In some embodiments, the process 345, 350, and 355 occur in staggered or serial relation to one another or only selectively as determined by the controller 140 at process 325. For example, engine controls may be implemented using process 345 and information provided at process 350, but no transmission controls are implemented using process 355.

As described herein, the controller 140 may determine, initiate/implement, maintain, and/or end the coasting opportunity in a variety of ways and, in turn, be based on real-time or nearly real-time feedback of important parameters and/or constraints. For example, the controller 140 (e.g., coasting prediction circuit 235) may determine an ideal engine off coasting opportunity based on the proximity of the vehicle 100 to another vehicle (e.g., a lead and/or a trailing vehicle), a closing rate of the vehicle 100 to a lead vehicle (e.g., a vehicle in front of vehicle 100), and/or proximity to other objects/information from various sources. For example, if the controller 140 determines that the vehicle 100 is within a predefined distance to a road intersection, the controller 140 may bypass (i.e., forego/not implement) an engine off opportunity, or alternatively, cause the engine to be turned back on if the engine is off when within the predefined distance. As an example, beacons (e.g., Bluetooth or other transceivers) may be included with traffic lights that the controller 140 pings or otherwise receives information from to determine the presence of intersections (or, an intersection may be determined from GPS or other map-based information). An intersection may also include a roundabout. Based on the determination of a presence of an intersection (e.g., traffic lights, roundabouts, etc.) within a predefined distance of the vehicle 100, the controller 140 may disable an engine off opportunity so to provide power/maneuverability to the operator while within a predefined distance of the intersection.

As yet another example, if the controller 140 determines that the vehicle is within a predefined distance of another vehicle, then the controller 140 may forego turning the engine off as the operator may need power for maneuverability. In contrast, if the controller 140 determines that the vehicle 100 is outside of a predefined distance of another vehicle, the controller 140 may enable and command turning the engine off.

Figure 4:
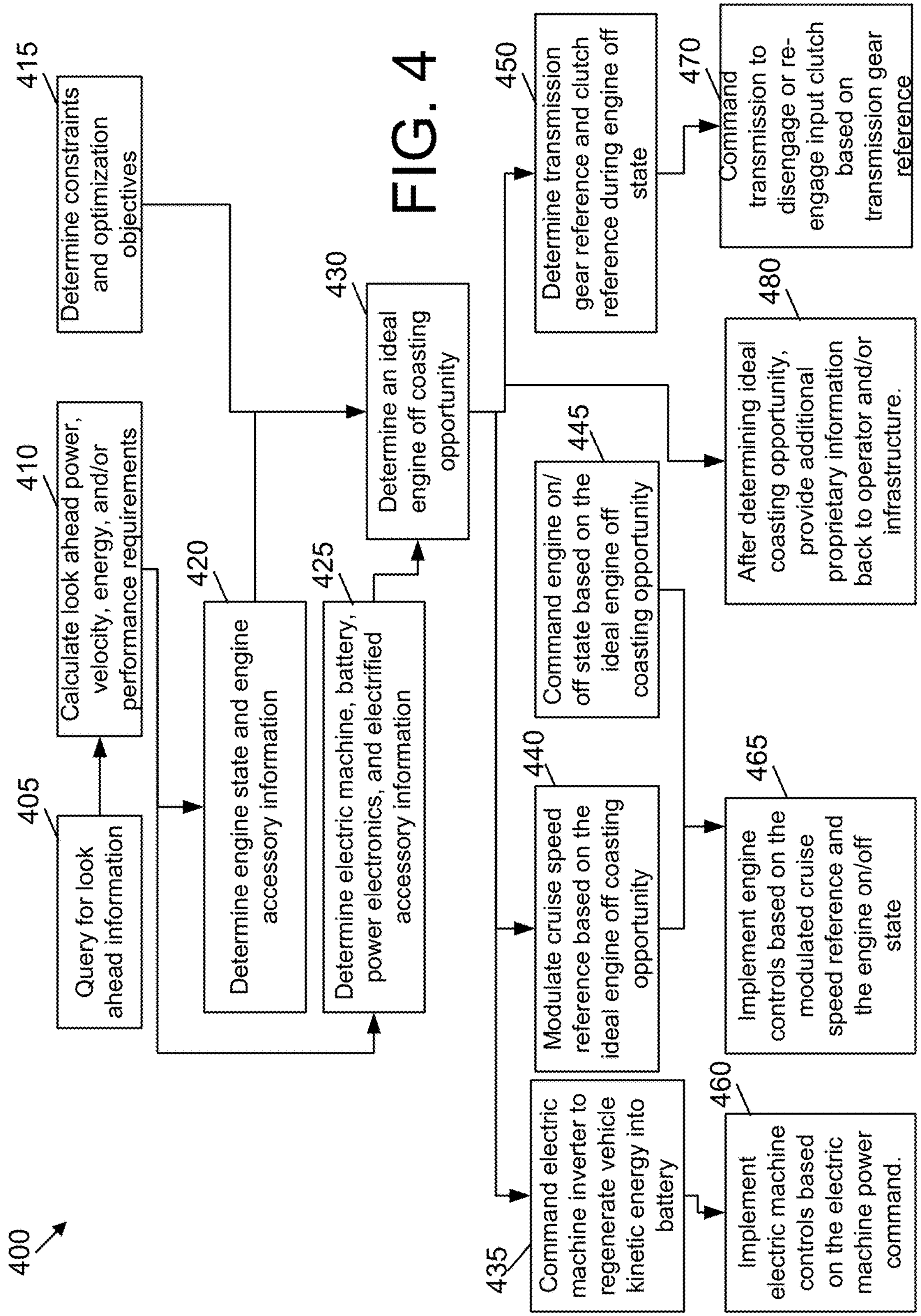
FIG. 4 is flow diagram of a method of implementing a predictive engine off coasting control strategy for an electric hybrid vehicle by the controller of FIGS. 1-2, according to an exemplary embodiment.

Referring now to FIG. 4, a method 400 of operating the vehicle 100 with the controller 140 is shown, according to another example embodiment. The method 400 is similar to method 300. However, the method 300 is shown as being implemented with a non-electrified powertrain while the method 400 is shown as being implemented with an at least partially electrified powertrain (e.g., hybrid vehicle, full electric vehicle, etc.). The processes 405-420, are similar to the processes 305-320 respectively and are described in more detail above.

At process 425, the controller 140 determines electric machine information, battery information, power electronics information, and electrified accessory information. The vehicle 100 may include electric HVAC or electric power steering, the use of which reduces the battery state of charge, affecting how long the vehicle 100 may keep its engine 125 off. The electric machine information, the battery information, the power electronics information, and the electrified accessory information is used in determining an ideal engine off coasting opportunity.

At process 430, the controller 140 determines an ideal engine off coasting opportunity taking into account information obtained or otherwise determined at processes 405-420. More specifically, the controller 140 determines an ideal engine off coasting opportunity based on engine state and the vehicle accessory information, the powertrain capability information, the battery state information, the vehicle performance objectives, the vehicle constraints, the electric machine state, and the look ahead information. For example, the controller 140 may determine an ideal engine off coasting opportunity by based on vehicle kinetic energy in a way that improves the overall system energy loss and powertrain efficiency while meeting performance objectives. More specifically, a current load on the vehicle 100 at a current location may be determined as described above with the aforementioned formulas/equations.

Additionally, a future load on the vehicle 100 at a future location and at a future time may also be predicted, determined, or otherwise estimated as described above. The controller 140 may then analyze the current load and the predicted future load to determine if the vehicle 100 has sufficient power given the current load to turn off the engine 125 (i.e., implement an ideal engine off coasting opportunity) for a certain distance and/or time at the future location and time while still meeting the predicted power demand/load at the future location and at the future time.

At process 435, the controller 140 commands the electric machine 106 to charge the battery 107. In some embodiments, the electric machine 106 includes or is coupled to an inverter that charges the battery 107 during while plugged into a grid power outlet. In some embodiments, the electric machine 106 charges the battery 107 using energy captured during regenerative braking or another regenerative activity. For example, the vehicle 100 may have extra kinetic energy during operation of the vehicle 100 and the controller 140 may regenerate the vehicle kinetic energy to the battery 107.

In some embodiments, the electric machine (e.g., motor-generator) may aid the controller 140 in implementing an ideal engine off coasting opportunity. For example, when implementing an ideal engine off coasting opportunity during a downhill portion of the vehicle's route, the controller 140 may allow the engine 125 to remain in an engine off state for a longer period of time (e.g., longer relative to when the regenerative braking feature is not being used in the vehicle) by using the regenerative braking function of the motor-generator to capture electrical energy and power the electric motor to drive the vehicle 100 to maintain a predefined following distance behind a lead vehicle and/or while maintaining the vehicle speed at or above a predefined minimum speed (e.g., a cruise control set speed). In operation, a predefined maximum speed for the vehicle 100 may be defined such that regenerative braking slows the vehicle to at or below the maximum speed and, simultaneously, provides captured electrical energy to the electric motor to elongate the engine off coasting opportunity. Additionally, during the downhill scenario, the regenerative braking feature, via a command from the controller 140, may charge, at least slightly, a battery pack while implementing the ideal engine off coasting opportunity. This is beneficial for hybrid vehicle situations to ensure battery charge levels above certain desired predefined thresholds.

As another example, when implementing an ideal engine off coasting opportunity during an uphill portion of the vehicle's route, the controller 140 may allow the engine 125 to remain in an engine off state for a relatively longer period of time by using the motor-generator to add driveline torque for a period of time and/or a certain distance. Adding driveline torque may be particularly helpful during a slight (e.g., short and/or low grade) uphill portion followed by a downhill portion of the driver's route. In operation, the controller 140 may selectively add driveline torque via the electric motor based on a state of charge of the battery and/or look ahead information. For example, using look ahead information, the controller 140 may determine that the instant uphill portion is followed by a downhill portion of the vehicle's route, such that an energy capture opportunity via regenerative braking is soon to be experienced. In which case, the controller 140 may command the electric motor to provide additional power to the vehicle 100 to drive the vehicle and prolong the engine off coasting event during the uphill portion based on the ability to recharge the battery (ies) relatively soon. This is an atypical operation given that typically engine power is desired to traverse uphill portions of a route. The controller may additionally examine a battery state of charge before commanding the electric motor power even if an opportunity for capturing electrical energy is coming. In this regard, the battery state of charge may be below a predefined threshold such that insufficient power to the electric motor may be provided to power the vehicle during the uphill portion even if an engine capture opportunity is upcoming (e.g., a downhill portion that enables activation of regenerative braking).

At process 460, the controller 140 implements the electric machine command controls within the electric machine 255 based on an electric machine power command required to supplement the engine 125 power provided and to achieve the desired cruise control set speed. At process 440, the controller 140 modulates the cruise control set speed based on the ideal engine off coasting opportunity determined 430 similarly to process 330 described above. At process 445, the controller 140 commands an engine on/off state based on the ideal engine off coasting opportunity. At process 450, the controller 140 determines a transmission gear reference and a transmission clutch reference during an engine off state based on the ideal engine off coasting opportunity similarly to process 340 described above. At process 460, the controller 140 implements electric machine controls based on the electric machine power command. For example, the electric machine power command may be an 80% to 20% power split between the electric machine 106 and the engine 125 for providing power to the vehicle 100 within a hybrid vehicle. At process 465, the controller 140 commands the engine 125 based on the modulated cruise control set speed and the determined on/off state for the engine 125 similarly to process 345 described above. At process 470, the controller 140 commands the transmission to implement the transmission gear and clutch reference in order to implement the ideal engine off coasting opportunity similarly to process 355 described above. At process 480, the controller 140 provides additional information back to the operator and/or infrastructure after determining and implementing the ideal engine off coasting opportunity similarly to process 350 described above.

Figure 5:
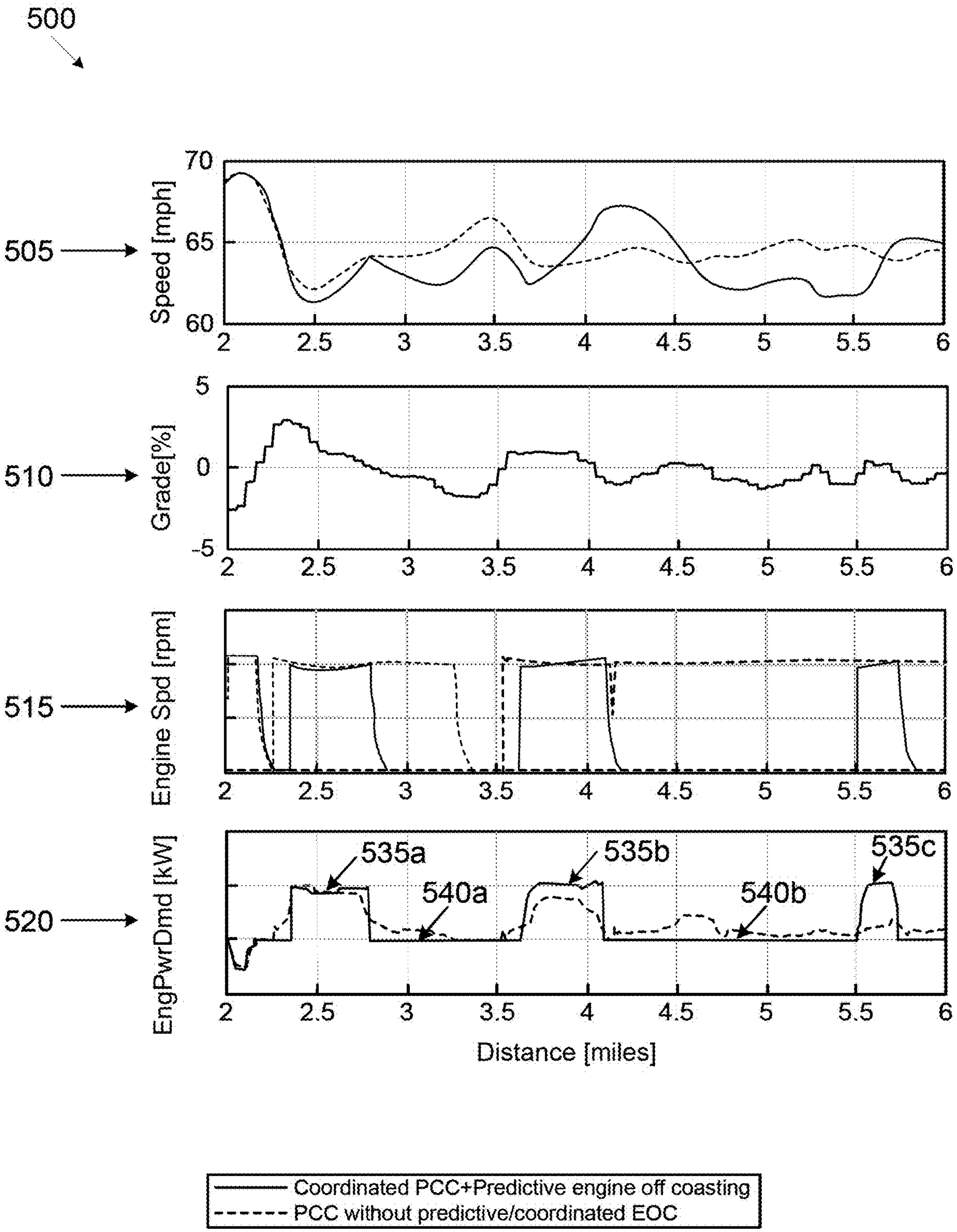
FIGS. 5-9 are graphs illustrating differences in vehicle performance between using the controller of FIGS. 1-2 compared to using a conventional predictive cruise controller in various scenarios, according to various exemplary embodiments.

Referring now to FIG. 5, a graph 500 illustrating the differences between using a predictive cruise control in coordination with predictive engine off coasting (from determining and implementing ideal engine off coasting opportunities) and predictive cruise control without predictive engine off coasting is shown, according to an example embodiment. More specifically, this graph shows a predictive cruise control system during flat or mild grad portions (i.e., road grade below a predefined uphill road grade amount and above a predefined downhill road grade value) of the route of the vehicles. Graph 500 has multiple sub-graphs including sub-graph 505 which shows the speed of the vehicle 100 (y-axis) with respect to distance (x-axis), sub-graph 510 which shows the road grade (y-axis) with respect to distance (x-axis), sub-graph 515 which shows engine speed (y-axis) with respect to distance (x-axis), and sub-graph 520 which shows engine power demand (y-axis) with respect to distance (x-axis). At graph portions 525*a*-525*c*, the engine speed stays high (above a predefined "high" speed threshold) for shorter periods of time when using predictive cruise control in coordination with predictive engine off coasting as opposed to graph portions 530*a*-530*b* which show the engine speed being high for longer periods of time when only predictive cruise control is used. The engine speed being high for shorter periods of times may be preferable because it may be more efficient and has higher fuel economy. Graph portions 535*a*-535*c* show a similar idea with engine power demand being high for shorter periods of time and zero for longer periods of time at 540*a*-540*b*. Again, this demonstrates a more efficient engine 125 when using predictive cruise control with coordinated predictive engine off coasting.

Figure 6:
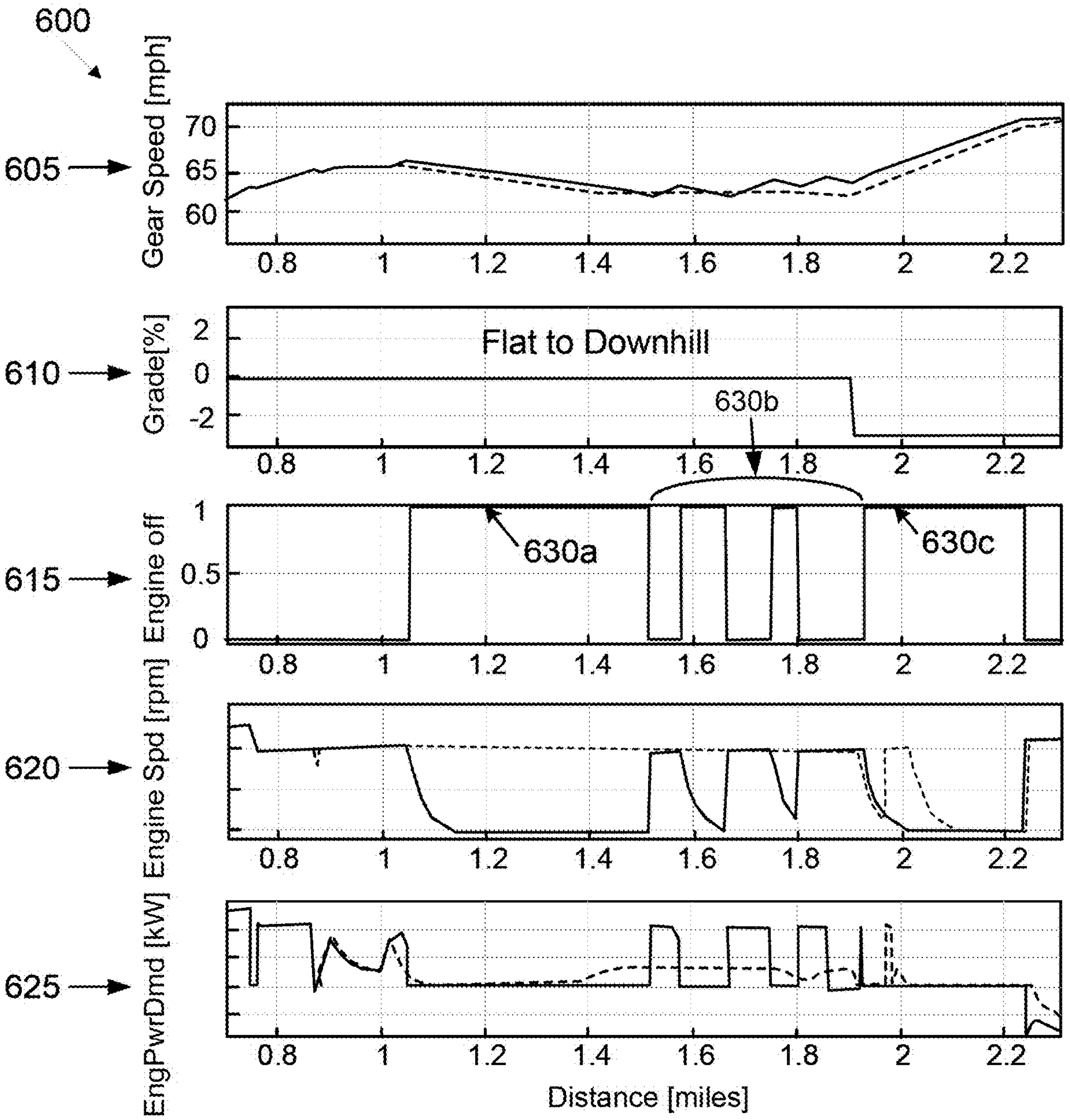

Referring now to FIG. 6, a graph 600 illustrating the differences between using a predictive cruise control in coordination with predictive engine off coasting (from determining and implementing ideal engine off coasting opportunities) and predictive cruise control without predictive engine off coasting. Graph 600 illustrates the benefits of predictive cruise control with predictive engine off coasting in a case where the vehicle 100 goes from a flat terrain to a downhill terrain. Graph 600 has multiple sub-graphs such as sub-graph 605 which shows the gear speed (y-axis) with respect to distance (x-axis), sub-graph 610 which shows the road grade (y-axis) with respect to distance (x-axis), sub-graph 615 which shows engine on/off state (y-axis) with respect to distance (x-axis), sub-graph 620 which shows engine speed (y-axis) with respect to distance (x-axis), and sub-graph 625 which shows engine power demand (y-axis) with respect to distance (x-axis). In this case, the predictive cruise control speed reference for the vehicle 100 is modulated to ramp down vehicle speed before the start of the downhill. At graph portion 630*a*, the engine turns off for the duration of the vehicle speed decrease as the vehicle approaches the downhill if possible. After the decrease in the vehicle's speed, the engine 125 periodically turns off and on at 630*b* at a controlled frequency so that the power demand alternates from high power/high efficiency to zero power. At graph portion 630*c*, the engine 125 turns off during the downhill in order to save additional fuel.

Figure 7:
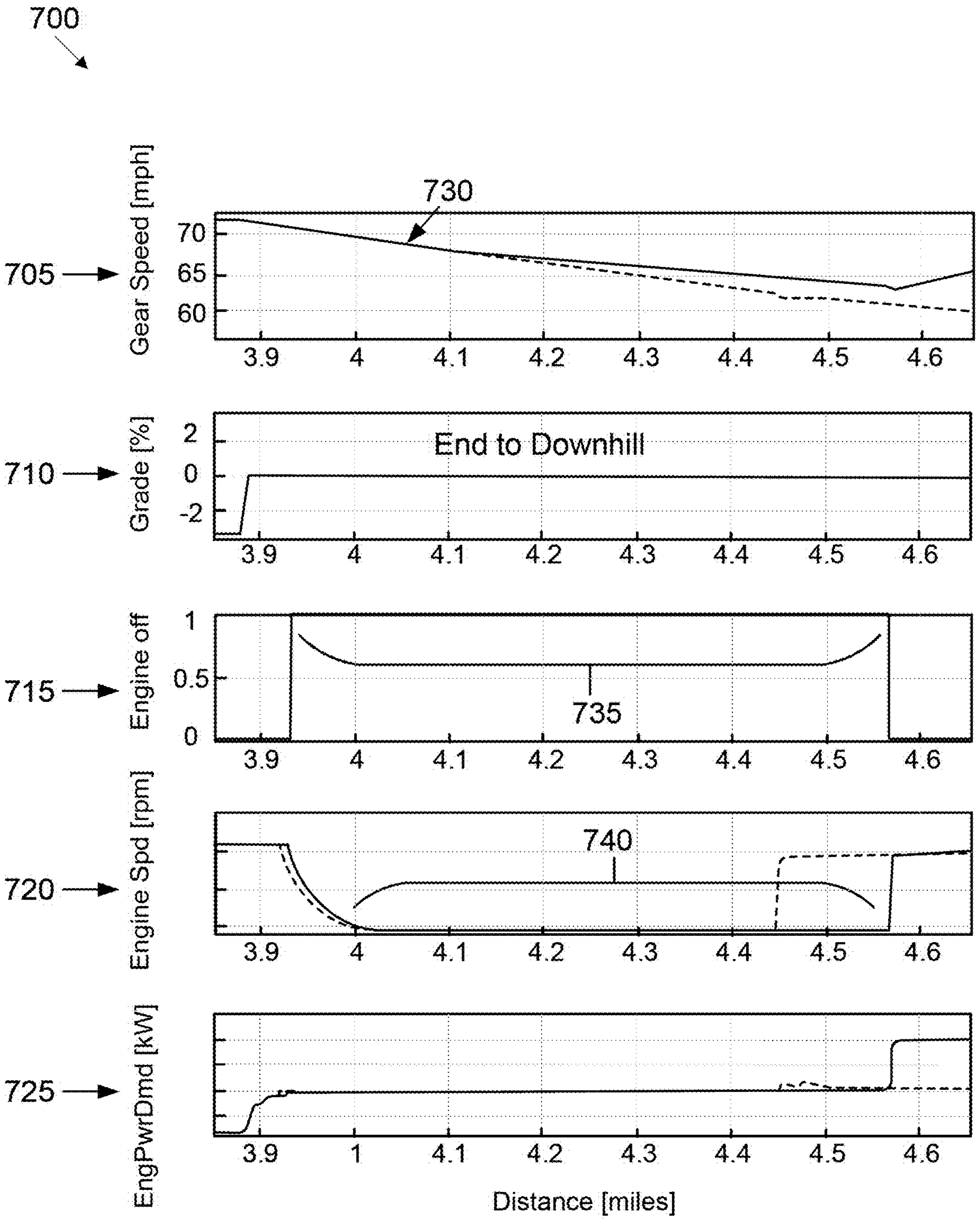

Referring now to FIG. 7, a graph 700 illustrating the differences between using a predictive cruise control in coordination with predictive engine off coasting (from determining and implementing ideal engine off coasting opportunities) and predictive cruise control without predictive engine off coasting. Graph 700 illustrates the benefits of predictive cruise control with predictive engine off coasting in a case where the vehicle reaches the end of a downhill. Graph 700 has multiple sub-graphs such as sub-graph 705 which shows the gear speed (y-axis) with respect to distance (x-axis), sub-graph 710 which shows the road grade (y-axis) with respect to distance (x-axis), sub-graph 715 which shows engine on/off state (y-axis) with respect to distance (x-axis), sub-graph 720 which shows engine speed (y-axis) with respect to distance (x-axis), and sub-graph 725 which shows engine power demand (y-axis) with respect to distance (x-axis). In this case, the controller 140 predicts a rise in look ahead power demand due to the end of a downhill. Therefore, the controller 140 modulates the predictive cruise control speed reference to ramp down the vehicle speed at the end of the downhill at 730. At graph portions 735 and 740, we can see that the engine 125 is commanded to be off during the duration of the vehicle speed being ramped down at the end of the downhill. As we can see from the graph, the engine 125 being off for a longer period of time increases efficiency and fuel economy.

Figure 8:
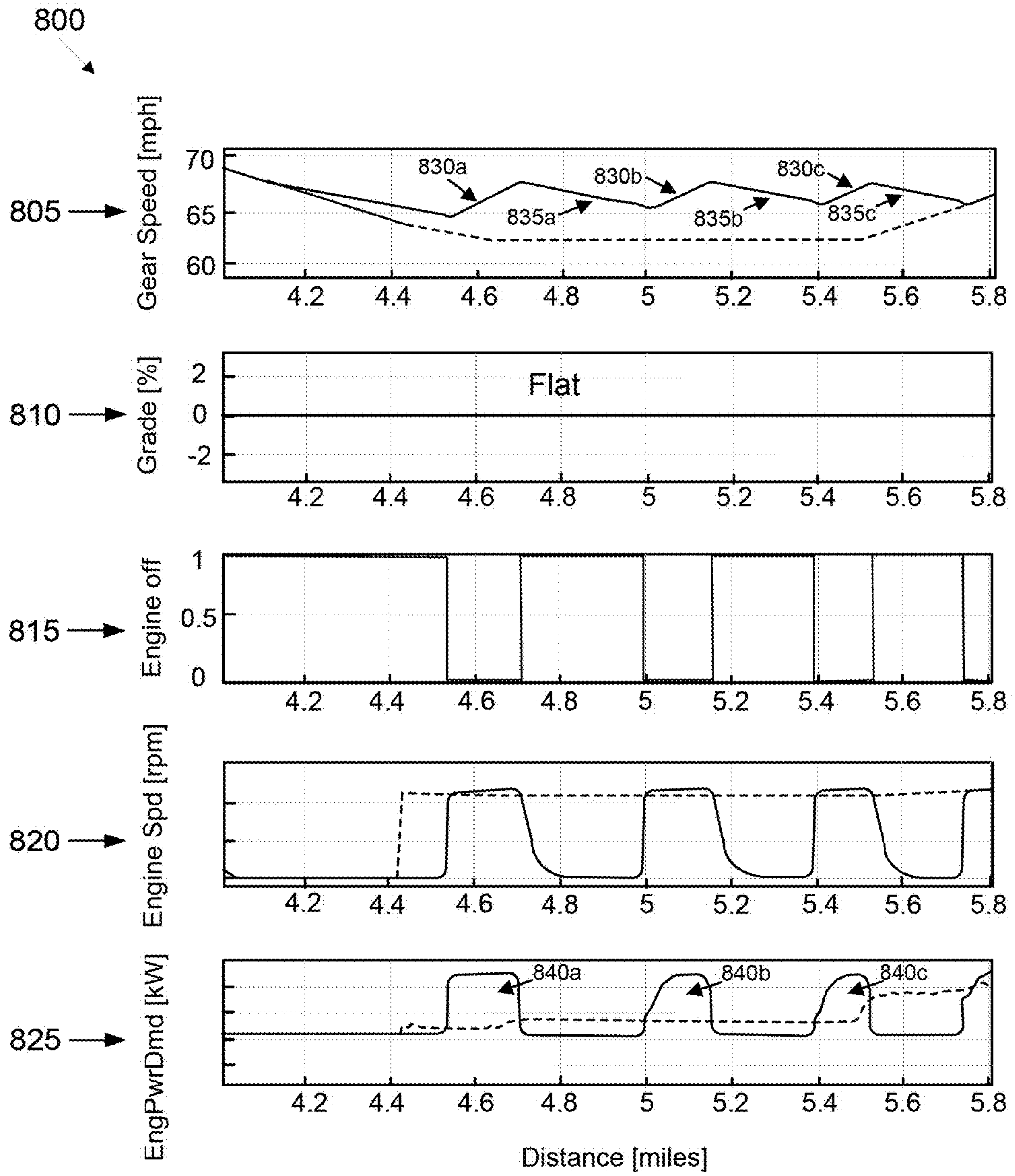

Referring now to FIG. 8, a graph 800 illustrating the differences between using a predictive cruise control in coordination with predictive engine off coasting (from determining and implementing ideal engine off coasting opportunities) and predictive cruise control without predictive engine off coasting. Graph 800 illustrates the benefits of predictive cruise control with predictive engine off coasting in a case where the vehicle 100 drives on flat terrain. Graph 800 has multiple sub-graphs such as sub-graph 805 which shows the gear speed (y-axis) with respect to distance (x-axis), sub-graph 810 which shows the road grade (y-axis) with respect to distance (x-axis), sub-graph 815 which shows engine on/off state (y-axis) with respect to distance (x-axis), sub-graph 820 which shows engine speed (y-axis) with respect to distance (x-axis), and sub-graph 825 which shows engine power demand (y-axis) with respect to distance (x-axis). In this case, the controller 140 predicts a low look ahead power demand due to the flat grade. Therefore, the controller 140 modulates the predictive cruise control speed reference to periodically speed up and then slow down the vehicle at 830*a*-830*c*. During vehicle speed up (e.g., graph portions 830*a*-830*b*), the engine power will be high (e.g., graph portions 840*a*-840*c*) and during vehicle slowdowns (e.g., graph portions 835*a*-835*c*), the engine power will be off. This demonstrates that the engine 125 will either be operating at a high efficiency or be off. In turn, this will increase engine efficiency and fuel economy.

Figure 9:
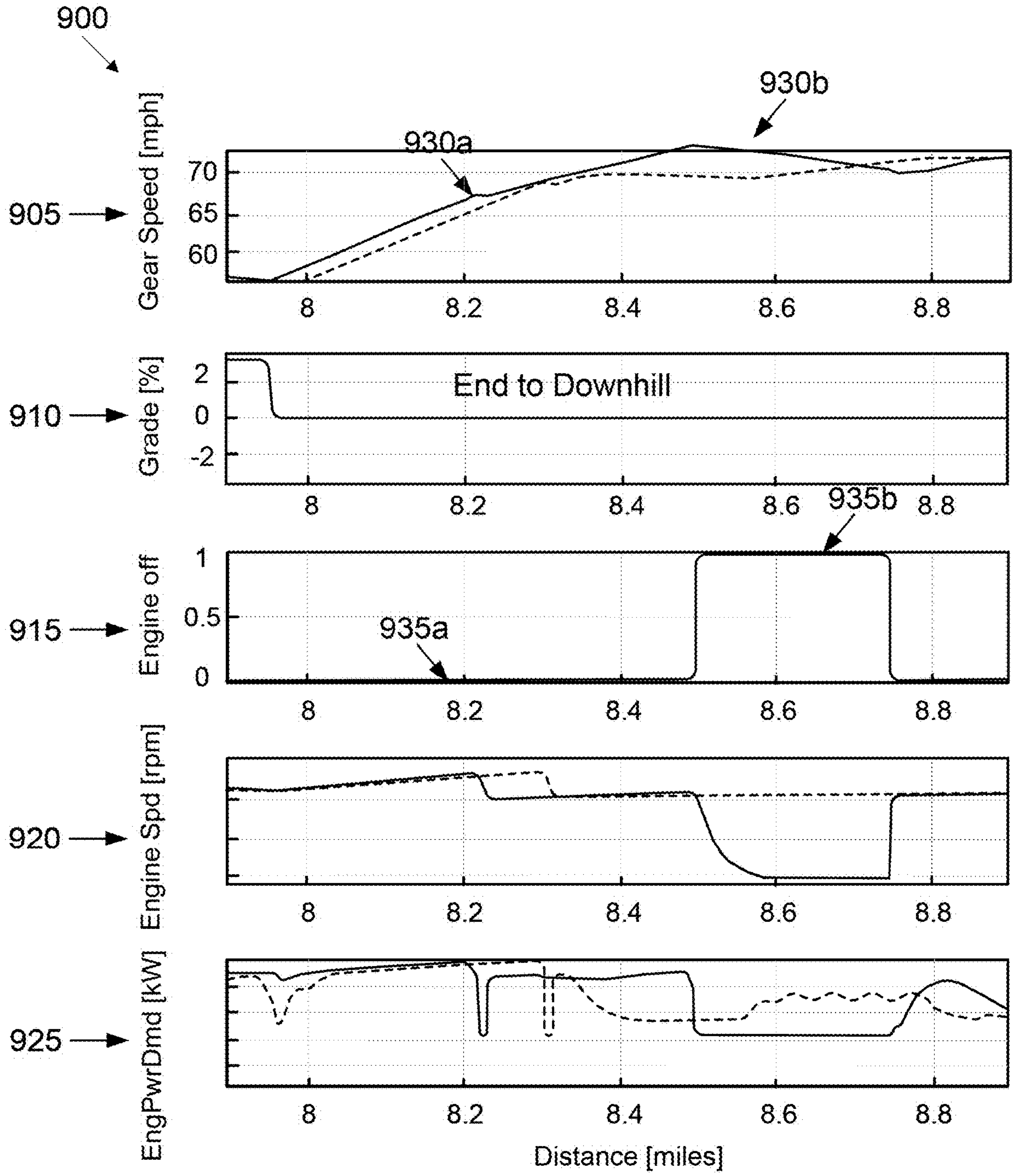

Referring now to FIG. 9, a graph 900 illustrating the differences between using a predictive cruise control in coordination with predictive engine off coasting (from determining and implementing ideal engine off coasting opportunities) and predictive cruise control without predictive engine off coasting. Graph 900 illustrates the benefits of predictive cruise control with predictive engine off coasting in a case where the vehicle 100 drives on the end of an uphill. Graph 900 has multiple sub-graphs such as sub-graph 905 which shows the gear speed (y-axis) with respect to distance (x-axis), sub-graph 910 which shows the road grade (y-axis) with respect to distance (x-axis), sub-graph 915 which shows engine on/off state (y-axis) with respect to distance (x-axis), sub-graph 920 which shows engine speed (y-axis) with respect to distance (x-axis), and sub-graph 925 which shows engine power demand (y-axis) with respect to distance (x-axis). In this case, the controller 140 predicts a drop in look ahead power demand due to the end of an uphill. Therefore, the controller 140 modulates the predictive cruise control speed reference to keep speeding up the vehicle 100 above the cruise control set speed after the speed has recovered at the end of the uphill, and then slows down the vehicle 100 to the cruise control set speed. During vehicle speed up (e.g., graph portion 930*a*), the engine power will be high (e.g., graph portion 935*a*) and during vehicle slowdowns (e.g., graph portions 930*b*), the engine power will be off (e.g., graph portion 935*b*). This demonstrates that the engine 125 will either be operating at a high efficiency or be off. In turn, this will increase engine efficiency and fuel economy.

An exemplary implementation is shown in FIG. 10 and depicts operation of the vehicle 100 that using predictive cruise control to meet a fuel saving economy objective (e.g., increase fuel economy) by determining an ideal engine off coasting opportunity where the battery 107 may supply motive power to the vehicle 100. At 1005, the controller 140 determines a cruise control set speed of, for example, 55 mph based on the calculated predicted future loads at future locations 1010 and 1015 (e.g., the future loads 1010 and 1015 are predicted using the Equations 1-15). More specifically, using look ahead information, the controller 140 sets the cruise control set speed while the vehicle 100 is in the location 1005 at, for example, 55 mph after determining that the vehicle 100 will traverse the uphill while maintaining a speed of 55 mph with +/− a droop setting (e.g., 5 mph) with the vehicle 100 charging the battery 107. At the location 1010 of the route, the vehicle speed drops to a lower speed within the droop setting (e.g., 50 miles per hour) and the controller 140 will maintain the engine 125 on (i.e., the engine 125 is running) until the state of charge of the battery 107 is equal to or higher than a SOC threshold determined in view of the look ahead information and that allows the engine 125 to turn off and fully power the vehicle 100 using the battery 107 in the location 1015 of the route. The vehicle 100 is propelled using power from the battery 107 based on the look ahead information and will reach the bottom of the downhill in location 1015 within the droop setting (e.g., 53 miles per hour). The controller 140 operates to turn off the engine 125 at the earliest time possible (e.g., at location 1020) and utilize the battery 107 to extend the engine off condition in location 1015 for as long as possible while maintaining the vehicle 100 speed within the droop setting relative to the cruise control set speed. In some embodiments, the vehicle 100 may utilize the regenerative braking functionality of the electrical machine 106 to further extend the engine off condition in location 1015. Once the vehicle speed decreases to the lower limit of the droop setting, the engine 125 is restarted by the controller 140.

Another exemplary implementation is shown in FIG. 11 and depicts the use of predictive cruise control to meet a fuel saving economy objective (e.g., increase fuel economy) by increasing a vehicle's cruise control set speed in anticipation of an uphill portion of the driver's route. At location 1105, the controller 140 increases the vehicle's cruise control set speed from a first set speed (e.g., 55 miles per hour) to a second set speed that is higher than the first set speed (e.g., 60 miles per hour) in anticipation of the uphill as determined based on look ahead information. As the vehicle 100 traverses the uphill at location 1110, the power demand for the vehicle 100 increases and the speed of the vehicle 100 decreases. Then at 1115, the controller 140 decreases the cruise control set speed from the second set point (e.g., 60 miles per hour) to the first set point (e.g., 55 miles per hour) in anticipation of the flat grade at location 1115 followed by a downhill at location 1120. The increase in set point speed (i.e. the second set point) allows the vehicle speed to be maintained within the desired range, while increasing the engine operating load. The increase in engine load may result in an increased engine out temperature of exhaust gas leaving the engine 125. The increased engine out temperature can be utilized to regenerate engine exhaust gas aftertreatment components with a relatively low fuel economy cost. At a location 1125, the controller 140 may determine, based on the look ahead information and the current vehicle status that the vehicle 100 will maintain the first set point with the engine off while traversing the downhill in location 1120. Therefore, the controller 140 turns off the engine at location 1120, after determining that the vehicle 100 can meet the power demand of the cruise control set speed+/− droop while the engine is off (e.g., using the battery 107). One benefit of increasing the set speed to the second, higher set speed, is a prolongment of the engine off time after the location 1125. In other words, the controller 140 operates the engine 125 at a lower fuel economy at a first location (e.g., the location 1110) in order to realize an overall fuel savings for the predictive cruise control horizon through the location 1120. In some embodiments, the vehicle 100 may utilize the regenerative braking functionality of the electrical machine 106 to further extend the engine off condition in location 1120. Once the vehicle speed decreases to the lower limit of the droop setting, the engine 125 is restarted by the controller 140.

Another exemplary implementation is shown in FIG. 12 and depicts a predictive cruise control operation that meets an emission objective (e.g., increase emissions filtering efficiency) by setting a cruise control set speed that increases a vehicle's aftertreatment system temperature (i.e., engine out temperature) which increases the efficiency of the aftertreatment system 115. At location 1205, the controller 140 sets the vehicle's cruise control set speed at a first set speed (e.g., 55 miles per hour) with a droop setting (e.g., +/− 5 miles per hour) and operates the engine 125 based on predicted the future loads and locations 1210, 1215, and 1220. As the vehicle 100 traverses the uphill at location 1210, the power demand for the vehicle 100 increases and the temperature of the aftertreatment system increases. The load on the engine 125 is proactively increased at locations 1210 and 1215 resulting in an increased aftertreatment system temperature (i.e., engine out temperature). The increased aftertreatment system temperature can be used by the aftertreatment system 115 to reduce emissions (e.g., $NO_x$ out), regenerate components (e.g., catalysts), etc. The cruise control set speed is not changed during operation because the vehicle speed is maintained within the droop setting by advantageously using the look ahead information to increase the engine loading at an uphill location 1210. At location 1225, the controller 140 determines that the engine 125 can be turned off based on the look ahead information and the current vehicle status sop that the vehicle 100 can traverse location 1220 with the engine 125 off in order to realize fuel savings. The controller 140 provides the result of increased engine out temperature by using the look ahead information while still allowing the engine 125 to be turned off at location 1225 and maximize overall fuel savings. In some embodiments, the vehicle 100 may utilize the regenerative braking functionality of the electrical machine 106 to further extend the engine off condition in location 1220. Once the vehicle speed decreases to the lower limit of the droop setting, the engine 125 is restarted by the controller 140.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIG. 2, it should be understood that the controller 140 may include any number of circuits for completing the functions described herein. For example, the look ahead circuit 230, the coasting prediction circuit 235, and the engine control circuit 240 may be combined in multiple circuits or as a single circuit. Additional circuits with additional functionality may also be included. Further, the controller 140 may further control other activity beyond the scope of the present disclosure.

As mentioned above and in one configuration, the "circuits" may be implemented in machine-readable medium for execution by various types of processors, such as the processor 215 of FIG. 2. Executable code may, for instance, comprise one or more physical or logical blocks of computer instructions, which may, for instance, be organized as an object, procedure, or function. Nevertheless, the executables need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising computer or machine-readable media for carrying or having computer or machine-executable instructions or data structures stored thereon. Such machine-readable media can be any available media that can be accessed by a computer. The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device. Machine-executable instructions include, for example, instructions and data which cause a computer or processing machine to perform a certain function or group of functions.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present disclosure may be written in any combination of one or more other programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods may be accomplished with standard programming techniques with rule-based logic and other logic to accomplish the various connection steps, processing steps, comparison steps, and decision steps.

It is important to note that the construction and arrangement of the apparatus and system as shown in the various exemplary embodiments is illustrative only. Additionally, any element disclosed in one embodiment may be incorporated or utilized with any other embodiment disclosed herein.

What is claimed is:

1. An apparatus, comprising:

one or more processing circuits comprising one or more memory devices coupled to one or more processors, the one or more memory devices configured to store instructions thereon that, when executed by the one or more processors, cause the one or more processors to:

receive look ahead information and store the look ahead information in the one or more memory devices, the look ahead information including an indication of an increase in road grade relative to a current road grade for a vehicle;

receive vehicle information regarding operation of the vehicle including an engine, an electrical machine, and an aftertreatment system, the vehicle information including a first driveline torque at which the electrical machine operates and a first temperature regarding the aftertreatment system;

determine a coasting opportunity for the vehicle based on the look ahead information and the vehicle information;

modulate a cruise control set speed based on the determined coasting opportunity, wherein the cruise control set speed is modulated upwards relative to a current cruise control set speed prior to traversing a hill associated with the increase in the road grade, wherein modulating the cruise control set speed upwards causes the temperature regarding the aftertreatment system to reach a second temperature greater than the first temperature, and wherein the engine charges an electrical power source for the electrical machine while traversing the hill and before the determined coasting opportunity;

turn the engine off during the determined coasting opportunity for the vehicle based on modulation of the cruise control set speed; and after turning the engine off, command the electrical machine to operate at a second driveline torque greater than the first driveline torque thereby extending a duration of the determined coasting opportunity, the commanding based on a state of charge of the electrical power source for the electrical machine meeting a threshold during the determined coasting opportunity in view of the look ahead information and the vehicle information.

2. The apparatus of claim 1, wherein the look ahead information includes one or more of the road grade, a speed limit, traffic information, or a weather condition at a particular location of a route of the vehicle.

3. The apparatus of claim 1, wherein the vehicle information includes one or more of an engine state, a plurality of vehicle performance constraints, a vehicle performance objective, a vehicle accessories state, a look ahead power, a look ahead velocity, a look ahead performance, or a look ahead energy requirement for the vehicle.

4. The apparatus of claim 3, wherein the vehicle performance objective is predetermined and stored within the one or more memory devices.

5. The apparatus of claim 4, wherein the vehicle performance objective is configured to dynamically change during operation of the vehicle.

6. The apparatus of claim 1, wherein the instructions further cause the one or more processors to determine a transmission setting while the engine is turned off.

7. The apparatus of claim 1, wherein the instructions further cause the one or more processors to provide one or more of an engine off time, an indicator of fuel consumption while the engine is turned off, or an indicator of performance of the vehicle to a user.

8. A method comprising:

receiving look ahead information and storing the look ahead information in one or more memory devices, the look ahead information including an indication of an increase in road grade relative to a current road grade for a vehicle;

receiving vehicle information regarding operation of the vehicle including an engine, an electrical machine, and an aftertreatment system, the vehicle information including a first driveline torque at which the electrical machine operates and a first temperature regarding the aftertreatment system;

determining a coasting opportunity for the vehicle based on at least one of the look ahead information or the vehicle information;

modulating a cruise control set speed based on the determined coasting opportunity, wherein the cruise control set speed is modulated upwards relative to a current cruise control set speed prior to traversing a hill associated with the increase in the road grade, wherein modulating the cruise control set speed upwards causes the temperature regarding the aftertreatment system to reach a second temperature greater than the first temperature, and wherein the engine charges an electrical power source for the electrical machine while traversing the hill and before the determined coasting opportunity;

turning the engine off during the determined coasting opportunity for the vehicle based on modulation of the cruise control set speed; and after turning the engine off, commanding the electrical machine to operate at a second driveline torque greater than the first driveline torque thereby extending a duration of the determined coasting opportunity, the commanding based on a state of charge of the electrical power source for the electrical machine meeting a threshold during the determined coasting opportunity in view of the look ahead information and the vehicle information.

9. The method of claim 8, wherein the look ahead information includes one or more of the road grade, a speed limit, traffic information, or a weather condition at a particular location of a route of the vehicle.

10. The method of claim 8, wherein the vehicle information includes one or more of an engine state, a plurality of vehicle performance constraints, a vehicle performance objective, a vehicle accessories state, a look ahead power, a look ahead velocity, a look ahead performance, or a look ahead energy requirement for the vehicle.

11. The method of claim 10, wherein the vehicle performance objective is configured to dynamically change during operation of the vehicle.

12. The method of claim 8, wherein the look ahead information includes an indication of a decrease in the road grade relative to the current road grade for the vehicle, the method further comprising modulating the cruise control set speed downwards relative to a current cruise control set speed.

13. The method of claim 8, further comprising bypassing turning the engine off during the determined coasting opportunity in response to the look ahead information indicating at least one of an intersection or another vehicle within a predefined distance of the vehicle.

14. A vehicle, comprising:

an aftertreatment system; and at least one controller coupled to an engine, an electrical machine, and to the aftertreatment system, the at least one controller comprising one or more processors and one or more memory devices coupled to the one or more processors, the one or more memory devices configured to store instructions thereon that, when executed by the one or more processors, cause the one or more processors to:

receive, from an external information source system, look ahead information and store the look ahead information in the one or more memory devices, the look ahead information including an indication of an increase in road grade relative to a current road grade for the vehicle;

receive vehicle information regarding operation of the vehicle, the vehicle information including a first driveline torque at which the electrical machine operates and a first temperature regarding the aftertreatment system;

determine a coasting opportunity for the vehicle based on the look ahead information the vehicle information;

modulate a cruise control set speed for the vehicle based on the determined coasting opportunity, wherein the cruise control set speed is modulated upwards relative to a current cruise control set speed prior to traversing a hill associated with the increase in the road grade, wherein modulating the cruise control set speed upwards causes the temperature regarding the aftertreatment system to reach a second temperature greater than the first temperature, and wherein the engine charges an electrical power source for the electrical machine while traversing the hill and before the determined coasting opportunity;

turn the engine off during the determined coasting opportunity for the vehicle based on modulation of the cruise control set speed; and after turning the engine off, command the electrical machine to operate at a second driveline torque greater than the first driveline torque thereby extending a duration of the determined coasting opportunity, the commanding based on a state of charge of the electrical power source for the electrical machine meeting a threshold during the determined coasting opportunity in view of the look ahead information and the vehicle information.

15. The vehicle of claim 14, wherein the instructions, when executed by the one or more processors, further cause the one or more processors to:

determine a transmission setting for the determined coasting opportunity; and command the transmission setting with a transmission of the vehicle.

16. The vehicle of claim 15, wherein the transmission setting is a neutral transmission setting.

17. The vehicle of claim 15, wherein commanding the transmission setting includes providing a prompt to an operator via an operator device to implement the transmission setting.

18. The vehicle of claim 14, wherein the instructions, when executed by the one or more processors, further cause the one or more processors to bypass turning the engine off during the determined coasting opportunity in response to the look ahead information indicating at least one of an intersection or another vehicle within a predefined distance of the vehicle.

19. The vehicle of claim 14, wherein the look ahead information includes one or more of the road grade, a speed limit, traffic information, or a weather condition at a particular location of a route of the vehicle.

* * * * *